US007209660B1

(12) United States Patent
Yee et al.

(10) Patent No.: US 7,209,660 B1
(45) Date of Patent: Apr. 24, 2007

(54) OPTICAL COMMUNICATIONS USING HETERODYNE DETECTION

(75) Inventors: Ting K Yee, Foster City, CA (US);
Peter H Chang, San Jose, CA (US)

(73) Assignee: Forster Energy LLC, Las Vegas, NV (US)

( * ) Notice: Subject to any disclaimer, the term of this patent is extended or adjusted under 35 U.S.C. 154(b) by 545 days.

(21) Appl. No.: 09/728,373

(22) Filed: Nov. 28, 2000

Related U.S. Application Data

(63) Continuation-in-part of application No. 09/474,659, filed on Dec. 29, 1999.

(51) Int. Cl.
| | |
|---|---|
| *H04B 10/145* | (2006.01) |
| *H04B 10/148* | (2006.01) |
| *H04B 10/207* | (2006.01) |
| *H04B 10/04* | (2006.01) |
| *H04B 10/06* | (2006.01) |
| *H04J 14/02* | (2006.01) |
| *H04J 1/04* | (2006.01) |
| *H04J 1/06* | (2006.01) |
| *H04J 1/08* | (2006.01) |

(52) U.S. Cl. .................... 398/71; 398/63; 398/68; 398/76; 398/82; 398/91; 398/141; 398/153; 398/163; 398/165; 398/168; 398/183; 398/186; 398/200; 398/204; 398/207

(58) Field of Classification Search .......... 398/204, 398/202, 76, 79, 192, 194, 198, 48, 69, 71, 398/72, 91, 205; 370/210; 385/16, 3; 725/101; 375/320

See application file for complete search history.

(56) References Cited

U.S. PATENT DOCUMENTS

| 2,924,706 A | * | 2/1960 | Sassler | .................... 455/202 |
| 3,680,120 A | * | 7/1972 | Benjamin | ................ 342/414 |
| 3,752,992 A | | 8/1973 | Fluhr | |
| 4,061,577 A | | 12/1977 | Bell | ........................ 398/76 |

(Continued)

FOREIGN PATENT DOCUMENTS

EP        0328156 A1    8/1989

(Continued)

OTHER PUBLICATIONS

Bachus, E.J. et al. "Coherent optical multicarrier systems." Journal of Lightwave Technology. vol. 7, No. 2, Feb. 1989: 375-384.*

(Continued)

*Primary Examiner*—Kenneth Vanderpuye
*Assistant Examiner*—David S Kim

(57) ABSTRACT

An optical communications system includes a receiver subsystem with at least two heterodyne receivers. The receiver subsystem receives a composite optical signal having two or more subbands of information and corresponding tones. An optical splitter splits the composite optical signal into optical signals. Each optical signal includes a subband(s) and corresponding tone. Each heterodyne receiver receives an optical signal. The receiver includes a heterodyne detector coupled to a signal extractor. The heterodyne detector mixes the optical signal with an optical local oscillator to produce an electrical signal which includes a frequency down-shifted version of the subband and the tone of the optical signal. The signal extractor mixes the frequency down-shifted subband with the frequency down-shifted tone to produce a frequency component containing the information.

31 Claims, 17 Drawing Sheets

U.S. PATENT DOCUMENTS

| | | | |
|---|---|---|---|
| 4,701,904 | A | 10/1987 | Darcie .......................... 398/72 |
| 4,807,227 | A * | 2/1989 | Fujiwara et al. .............. 398/48 |
| 4,953,156 | A | 8/1990 | Olshansky et al. ........... 398/76 |
| 5,140,453 | A * | 8/1992 | Tsushima et al. ........... 398/205 |
| 5,142,402 | A * | 8/1992 | Tsushima et al. ........... 398/205 |
| 5,162,937 | A | 11/1992 | Heidemann et al. |
| 5,272,556 | A * | 12/1993 | Faulkner et al. .............. 398/71 |
| 5,305,134 | A | 4/1994 | Tsushima et al. |
| 5,351,148 | A | 9/1994 | Maeda et al. .................. 398/76 |
| 5,387,927 | A | 2/1995 | Look et al. .................. 725/114 |
| 5,430,568 | A | 7/1995 | Little et al. .................... 398/81 |
| 5,546,190 | A * | 8/1996 | Hill et al. ...................... 398/76 |
| 5,559,561 | A | 9/1996 | Wei ............................. 348/470 |
| 5,576,874 | A | 11/1996 | Czerwiec et al. ............. 398/75 |
| 5,589,969 | A | 12/1996 | Taga et al. |
| 5,589,970 | A | 12/1996 | Lyu et al. |
| 5,596,436 | A * | 1/1997 | Sargis et al. ................... 398/76 |
| 5,680,238 | A | 10/1997 | Masuda ....................... 398/76 |
| 5,724,169 | A | 3/1998 | LaGasse |
| 5,896,211 | A * | 4/1999 | Watanabe ..................... 398/76 |
| 5,930,231 | A | 7/1999 | Miller et al. ................ 370/210 |
| 5,956,166 | A * | 9/1999 | Ogata et al. ................... 398/69 |
| 6,038,357 | A | 3/2000 | Pan |
| 6,058,227 | A * | 5/2000 | Wong ........................... 385/16 |
| 6,134,033 | A | 10/2000 | Bergano et al. |
| 6,236,480 | B1 | 5/2001 | Atlas |
| 6,342,961 | B1 | 1/2002 | Bergano et al. |
| 6,459,515 | B1 | 10/2002 | Bergano |
| 6,493,131 | B1 | 12/2002 | Tarng et al. |
| 6,580,535 | B1 | 6/2003 | Schonfelder |
| 6,735,395 | B1 | 5/2004 | Bai |
| 6,766,116 | B2 | 7/2004 | Webb |
| 6,904,240 | B1 | 6/2005 | Suga et al. |
| 2002/0076132 | A1 | 6/2002 | Peral et al. |

FOREIGN PATENT DOCUMENTS

| | | |
|---|---|---|
| EP | 0496298 A | 7/1992 |
| EP | 0507508 A2 | 10/1992 |
| EP | 0 717 521 A | 6/1996 |
| EP | 0 756 393 A1 | 1/1997 |
| GB | 2179517 A | 3/1987 |
| GB | 2179817 A | 3/1987 |
| JP | 07046187 A * | 2/1995 |

OTHER PUBLICATIONS

Glance, B.S. et al. "WDM coherent optical star network." Journal of Lightwave Technology. vol. 6, No. 1, Jan. 1988: 67-72.*

Tsukamoto, K. et al. "Coherent fiber-optic microcellular radio communication system using RF-to-optic direct conversion scheme." IEEE Global Telecommunications Conference, 1995. GLOBECOM '95. Nov. 13-17, 1995: 1987-1991 vol. 3.*

Betts, G.E. et al. "Semiconductor laser sources for externally modulated microwave analog links." IEEE Transactions on Microwave Theory and Techniques, vol. 45, No. 8. Aug. 1997: 1280-1287.*

Ellis, R.B. and M.H. Capstick. "Feedback control of a linearised Mach-Zehnder modulator for SCM applications." 1996., 2nd High Frequency Postgraduate Student Colloquium. Feb. 13, 1996: 33-38.*

Corvaja, R. et al. "Accurate performance evaluation of weakly coherent optical systems." Journal of Lightwave Technology, vol. 10, No. 11. Nov. 1992: 1665-1673.*

Fan, J. et al. "Preamplfier ASK system performance with incomplete ASK modulation: influence of ASE and laser phase noise." Journal of Lightwave Technology, vol. 13, No. 2. Feb. 1995: 302-311.*

Foschini, G.J. et al. "Noncoherent detection of coherent lightwave signals corrupted by phase noise." IEEE Transactions on Communications, vol. 36, No. 3. Mar. 1988: 306-314.*

Garrett, I. et al. "Theoretical analysis of heterodyne optical receivers for transmission systems using (semiconductor) lasers with non-negligible linewidth." Journal of Lightwave Technology, vol. 4, No. 3. Mar. 1986: 323-334.*

Jacobsen, G. et al. "The effect of crosstalk and phase noise in multichannel coherent optical ASK systems." Journal of Lightwave Technology, vol. 9, No. 8. Aug. 1991: 1006-1018.*

Tonguz, O.K. et al. "Performance of coherent ASK lightwave systems with finite intermediate frequency." IEEE Transactions on Communications, vol. 45, No. 3. Mar. 1997: 344-351.*

Hao. M.J. et al. "Performance evaluation of FSK and CPFSK optical communication systems: a stable and accurate method." Journal of Lightwave Technology, vol. 13, No. 8, Aug. 1995: 1613-1623.*

Kaminow. I.P. "Non-coherent photonic frequency-multiplexed access networks." IEEE Network, vol. 3, No. 2, Mar. 1989: 4-12.*

Kazovsky, L.G et al. "ASK and FSK coherent lightwave systems: a simplified approximate analysis." Journal of Lightwave Technology, vol. 8, No. 3, Mar. 1990: 338-352.*

Yamamoto, Y. "Receiver performance evaluation of various digital optical modulation-demodulation systems in the 0.5-10 μm wavelength region." IEEE Journal of Quantum Electronics, vol. 16, No. 11, Nov. 1980: 1251-1259.*

Sargis, Paul D., et al., "10-Gb/s Subcarrier Multiplexed Transmission Over 490 km of Ordinary Single-Mode Fiber Without Dispersion Compensation," IEEE Photonics Technology Letters, vol. 9, No. 12, Dec. 1997, pp. 1658-1660.

Corvaja, Roberto, et al., "Bit Error Rate Evaulation of Dual-Filter Heterodyne FSK Optical System," Journal of Optical Communications, Dec. 1, 1994, vol. 15, No. 6, Berlin, DE, pp. 208-213.

Fong, Thomas K., et al., "Linewidth-Insensitive Coherent AM Analog Optical Links Using Semiconductor Lasers," IEEE Photonics Technology Letter, Apr. 1, 1993, vol. 5, No. 4, New York, pp. 469-471.

Campos, L.A. et al., "16-Gbit/s time- and polarization-division-multiplexed system using a novel compensation technique," *Optical Fiber Communication Conference Technical Digest Series* (Washington, DC 1994), vol. 4, pp. 14-15.

Hill, P.M. et al., "Optical Polarization Division Multiplexing at 4 Gb/s," *IEEE Photonics Technology Letters* (May 1992), vol. 4, No. 5, pp. 500-502.

Kawanishi, S. et al., "100 Gbit/s all-optical demultiplexing using four-wave mixing in a travelling wave laser diode amplifier," *Electronics Letters* (Jun. 9, 1994), vol. 30, No. 12, pp. 981-982.

Invitation to Pay Additional Fees, Annex to Form PCT/ISA/206 Communication Relating to the Results of the Partial International Search, International Application No. PCT/US02/04582, Jun. 16, 2003, 6 pages.

Dai, H., C. Lin, M. Ramachandran, "Hybrid AM/QAM Video Trunking Lightwave Systems With Cascaded EDFAs", *Conf. Proc. LEOS, 97 Annual Meeting, IEEE Lasers & Electro Optic Society*, 1997, vol. 1, pp. 319-320.

Hiramatsu, A. et al., "Hypermedia Photonic Information Network Based on WDM-SCM Broadcast and Select Switching," Conference Proceedings, Leos '96 9th Annual Meeting, IEEE Lasers and Electro-Optics Society 1996 Annual Meeting (Cat. No. 96CH35895), Boston, MA, Nov. 18-19, 1996, pp. 312-313.

Ho, K., H. Dai, C. Lin, "Hybrid WDM Digital Trunking System for both HFC and FTTC Access Networks", Digest IEEE/LEOS 1996 Summer Topical Meetings (Cat. No. 96th 8164), NY, NY, pp. 37-38.

Kanno, N., K. Ito, "Fiber Optic Subcarrier Multiplexing Transport for Broadband Subscriber Distribution Network", *IEEE Intl. Conference on Communications Boston ICC/89 World Prosperity Through Communications*, Jun. 11-14, 1989, Boston, MA, vol. 2, pp. 996-1003.

Kavehrad, M., E. Savov, "Fiber-Optic Transmission of Microwave 64-QAM Signals", IEEE Journal on Selected Areas in Communications, vol. 8, No. 7, Sep. 1990, pp. 1320-1326.

Lu, X., G.E. Bodeep, T.E. Darcie, "Broad-Band AM-VSB/64 QAM Cable TV System Over Hybrid Fiber/Coax Network," IEEE Photonics Technology Letters, vol. 7, No. 4, Apr. 1995, pp. 330-332.

Nakamura, Y., H. Ohtsuka, S. Aikawa, H. Takanashi, "Advanced Techniques for Super Mutli-Carrier Digital Microwave Radio With Trellis-Coded 256 QAM Modulation", NTT Radio Communication Systems Laboratories), pp. 389-394.

Nishikido, J. et al., "Multiwavelength Securely-Authenticated Broadband Network" 11th International Conference on Integrated Optics and Optical Fibre Communications, 23rd European Conference on Optical Communications IOOC-ECOC 97 (Conf. Publ. No. 448), Sep. 22, 1997, pp. 17-20.

Ohtsuka, H., O. Kagami, S. Aikawa, H. Takanashi, "256-QAM Subcarrier Transmission for Braodband Distribution Networks", NTT Radio Communications Systems Laboratories, GlobeCom '91, pp. 1817-1822.

Park, J., A. Elrefaie, K. Lau, "1550-nm Transmission of Digitally Modulated 28-GHz Subcarriers Over 77 km of Nondispersion Shifted Fiber", *IEEE Photonics Technology Letters*, Feb. 1997, vol. 9, Issue 2, pp. 256-258.

Ryan, J., "WDM: North American Deployment Trends," *IEEE Communications Magazine*, Feb. 1998, pp. 40-44.

Schlump, Dieter et al.: "Electronic equalization of PDM and chromatic dispersion induced distortion after 100 km standard fibre at 10 Gbit/s" Proceedings of the European Conference on Optical Communication, Sep. 20, 1998, pp. 535-536.

Tai, C., Pi-Yang Chiang, W. Way, "Eight-Way, 70-km Transmission of 33-Channel 64-QAM Signals Utilizing a 1.3-μm External Modulation System and Semiconductor Optical Amplifier", *IEEE Photonics Technology Letters*, vol. 8, No. 9, Sep. 1996, pp. 1244-1248.

Tang, D., "Multi-Gigabit Fiber-Optic Video Distribution Network Using BPSK Microwave Subcarriers", IEEE 1989 MTT-S Intl. Microwave Symp Digest, Jun. 13-15, 1989, Long Beach, CA, vol. 2, pp. 697-701.

Wilson, G, "Capacity of QAM SCM systems utilising optically linearised Mach-Zehnder modulator as transmitter", Electronic Letters, vol. 34, No. 25, Dec. 10, 1998, pp. 2372-2374.

Kitayama, K. "Highly spectrum efficient OFDM/PDM wireless networks by using optical SSB modulation." Journal of Lightwave Technology. vol. 16, No. 6. Jun. 1998; 969-976.

Othonos, A. "Fiber Bragg gratings." Review of Scientific Instruments. vol. 68, Issue 12. Dec. 1997; 4309-4341.

Ramaswami, R. and K.N. Sivarajan. "Optical Networks: A Practical Perspective." San Francisco: Morgan Kaufman Publishers, Inc., 1998.

Watanabe, S. et al. "Optical coherent broad-band transmission for long-haul and distribution systems using subcarrier multiplexing." Journal of Lightwave Technology. vol. 11, No. 1, Jan. 1993; 116-127.

* cited by examiner

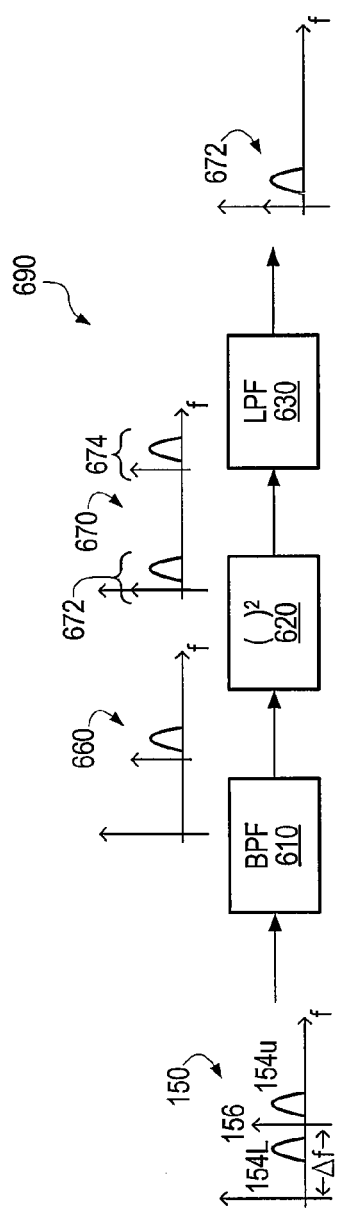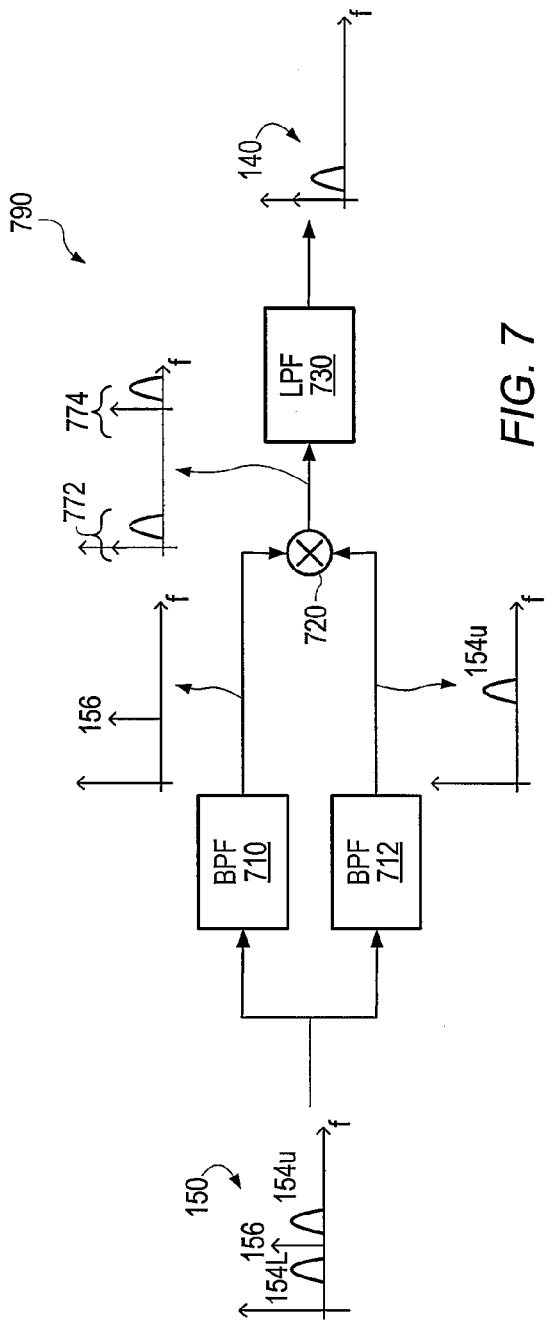
FIG. 6
FIG. 7

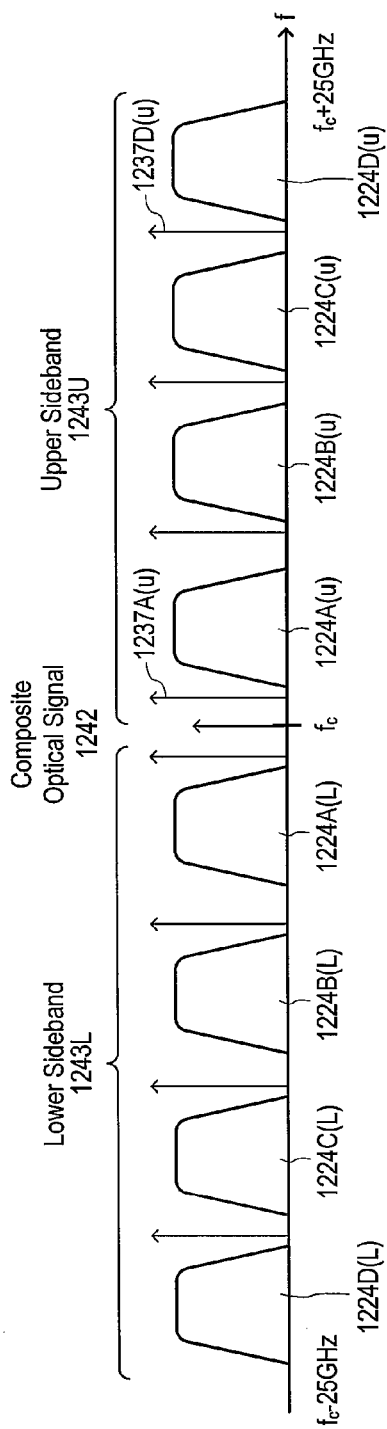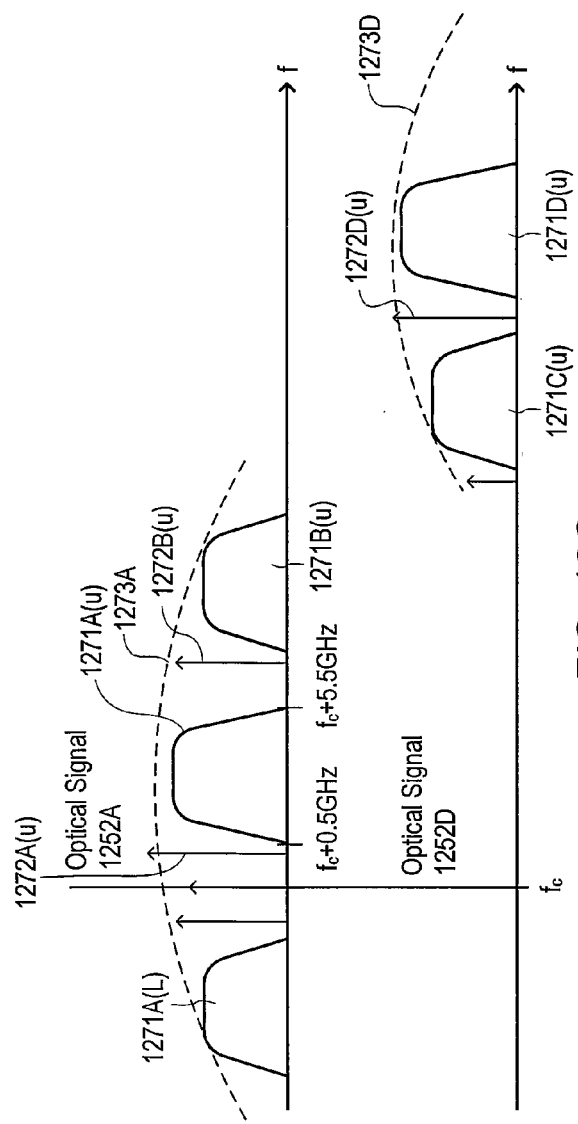

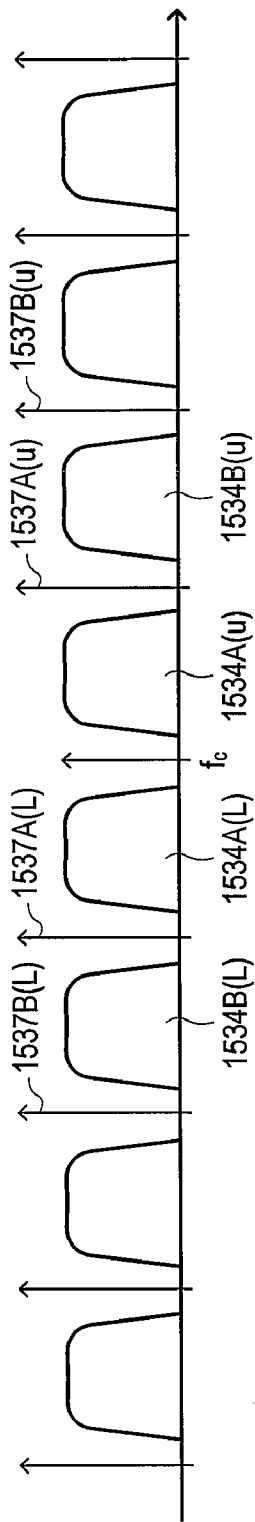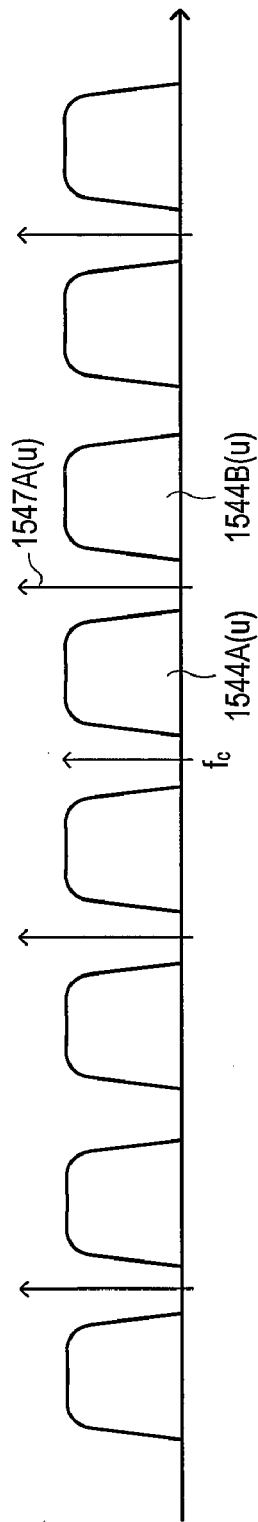

OPTICAL COMMUNICATIONS USING HETERODYNE DETECTION

CROSS-REFERENCE TO RELATED APPLICATION

This application is a continuation-in-part of pending U.S. patent application Ser. No. 09/474,659, "Optical Communications System Using Heterodyne Detection", by Ting K. Yee and Peter H. Chang, filed Dec. 29, 1999.

This application relates to pending U.S. patent application Ser. No. 09/405,367, "Optical Communications Networks Utilizing Frequency Division Multiplexing," by Michael W. Rowan, et al., filed Sep. 24, 1999; which is a continuation-in-part of pending U.S. patent application Ser. No. 09/372,143, "Optical Communications Utilizing Frequency Division Multiplexing and Wavelength-Division Multiplexing," by Peter H. Chang, el al., filed Aug. 20, 1999; which is a continuation-in-part of U.S. patent application Ser. No. 09/229,594, "Electrical Add-Drop Multiplexing for Optical Communications Networks Utilizing Frequency Division Multiplexing," by David B. Upham, et al., filed Jan. 13, 1999; which is a continuation-in-part of U.S. patent application Ser. No. 09/035,630, "System and Method for Spectrally Efficient Transmission of Digital Data over Optical Fiber", by Michael W. Rowan, et al., filed Mar. 5, 1998.

The subject matter of all of the foregoing applications is incorporated herein by reference.

BACKGROUND OF THE INVENTION

1. Field of the Invention

This invention relates generally to optical fiber communications, and more particularly, to the use of heterodyne detectors in receivers for optical fiber communications systems.

2. Description of the Related Art

As the result of continuous advances in technology, particularly in the area of networking, there is an increasing demand for communications bandwidth. For example, the growth of the Internet, home office usage, e-commerce and other broadband services is creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3, OC-3, or equivalent connections in the near future. As a result, the networking infrastructure will be required to accommodate greatly increased traffic.

Optical fiber is a transmission medium that is well-suited to meet this increasing demand. Optical fiber has an inherent bandwidth which is much greater than metal-based conductors, such as twisted pair or coaxial cable. There is a significant installed base of optical fibers and protocols such as SONET have been developed for the transmission of data over optical fibers. Typical communications system based on optical fibers include a transmitter, an optical fiber, and a receiver. The transmitter converts the data to be communicated into an optical form and transmits the resulting optical signal across the optical fiber to the receiver. The receiver recovers the original data from the received optical signal. Recent advances in transmitter and receiver technology have also resulted in improvements, such as increased bandwidth utilization, lower cost systems, and more reliable service.

However, current optical fiber systems also suffer from drawbacks which limit their performance and/or utility. For example, optical fibers typically exhibit dispersion, meaning that signals at different frequencies travel at different speeds along the fiber. More importantly, if a signal is made up of components at different frequencies, the components travel at different speeds along the fiber and will arrive at the receiver at different times and/or with different phase shifts. As a result, the components may not recombine correctly at the receiver, thus distorting or degrading the original signal. In fact, at certain frequencies, the dispersive effect may result in destructive interference at the receiver, thus effectively preventing the transmission of signals at these frequencies. Dispersion effects may be compensated by installing special devices along the fiber specifically for this purpose. However, the additional equipment results in additional power loss (e.g., insertion loss) as well as in additional cost, and different compensators will be required for different types and lengths of fiber. Other fiber effects, such as fiber nonlinearities, can similarly degrade performance.

As another example, the transmitter in an optical fiber system typically includes an optical source, such as a laser, and an external modulator, such as a Mach-Zender modulator (MZM). The source generates an optical carrier and the modulator is used to modulate the optical carrier with the data to be communicated. In many applications, linear modulators are preferred in order to increase the performance of the overall system. MZMs, however, are inherently nonlinear devices. Linear operation is approximated by biasing the MZM at its quadrature point and then limiting operation of the MZM to a small range around the quadrature point, thus reducing the effect of the MZM's nonlinearities. However, this results in an optical signal with a large carrier (which contains no information) and a small modulated signal (which contains the data to be communicated). A larger optical signal to noise ratio is required to compensate for the large carrier.

As a final example, optical fibers have an inherently large bandwidth available for the transmission of data, but constructing transmitters and receivers which can take advantage of this large bandwidth can be problematic. First, current approaches, such as the on-off keying and time-division multiplexing of signals used in the SONET protocols, cannot be extended to higher speeds in a straightforward manner. This is because current electronics technology limits the speeds at which these approaches can be implemented and electronics fundamentally will not have sufficient bandwidth to fill the capacity of a fiber. Even if this were not a limitation, current modulation schemes such as on-off keying are not spectrally efficient; more data can be transmitted in less bandwidth by using more efficient modulation schemes.

Current optics technology also prevents the full utilization of a fiber's capacity. For example, in wavelength division multiplexing, signals are placed onto optical carriers of different wavelengths and all of these signals are transmitted across a common fiber. However, the components which combine and separate the different wavelength signals currently place a lower limit on the spacing between wavelengths, thus placing an upper limit on the number of wavelengths which may be used. This also leads to inefficient utilization of a fiber's bandwidth.

The ever-increasing demand for communications bandwidth further aggravates many of the problems mentioned above. In order to meet the increasing demand, it is desirable to increase the data rate of transmission across each fiber. However, this typically can only be achieved by either increasing the bandwidth being utilized and/or by increasing the spectral efficiency of the encoding scheme. Increasing the bandwidth, however, aggravates frequency-dependent effects, such as dispersion. Increasing the spectral efficiency increases the signal to noise requirements.

Thus, there is a need for optical communications systems which more fully utilize the available bandwidth of optical fibers. There is further a need to reduce or eliminate the deleterious effects caused by fiber dispersion, to reduce the power contained in the optical carrier, and to combat the many drawbacks mentioned above.

SUMMARY OF THE INVENTION

In accordance with the present invention, an optical communications system is for communicating information across an optical fiber and includes a receiver subsystem. The receiver subsystem includes an optical splitter coupled to at least two heterodyne receivers. The optical splitter receives a composite optical signal having at least two subbands of information and at least one tone. The optical splitter splits the composite optical signal into at least two optical signals. Each optical signal includes a different one of the subbands and a corresponding one of the tones. Each heterodyne receiver receives one of the optical signals and recovers information from the subband contained in the optical signal. Each heterodyne receiver includes a heterodyne detector coupled to a signal extractor. The heterodyne detector mixes the optical signal, which includes a subband and tone, with an optical local oscillator to produce an electrical signal which includes a frequency down-shifted version of the subband and the tone. The signal extractor mixes the frequency down-shifted subband with the frequency down-shifted tone to produce a frequency component containing the information.

In one embodiment, the receiver subsystem further includes at least two frequency division demultiplexers (FDM demultiplexers) coupled to at least two quadrature amplitude demodulation (QAM demodulation) stages. The FDM demultiplexer separates the frequency component received from a heterodyne receiver into a plurality of electrical low-speed channels using FDM demultiplexing techniques. Each QAM demodulation stage recovers the electrical low-speed channels using QAM demodulation.

In another aspect of the invention, the optical communications system further includes a transmitter subsystem for generating the composite optical signal. In one variation, the transmitter subsystem includes at least two transmitters coupled to an optical combiner. Each transmitter generates a subband(s) using a different optical carrier frequency. The optical combiner then optically combines the subbands to form the composite optical signal. In another variation, the transmitter subsystem includes at least two electrical transmitters coupled to an FDM multiplexer coupled to an E/O converter. Each electrical transmitter generates an electrical channel. The FDM multiplexer combines the electrical channels into an electrical high-speed channel using FDM techniques. The electrical high-speed channel further includes the tones. The E/O converter converts the electrical high-speed channel from electrical to optical form, thus producing the composite optical signal.

The present invention has many advantages. For example, the use of heterodyne detection increases the sensitivity of the receiver subsystem. Thus, either lower power optical signals or longer transmission lengths may be supported. Heterodyne detection also results in greater wavelength selectivity (for example, as compared to direct detection). This allows the use of less costly components elsewhere (for example, a conventional optical power splitter rather than a WDM demultiplexer for the optical splitter). It also allows different wavelength carriers to be more closely spaced. The use of FDM and QAM also facilitates this since these techniques result in signals which are more spectrally confined (e.g., the power spectrum drops off more quickly with frequency as compared to on-off keying), thus allowing signals to be placed closer to each other. FDM and QAM are also more spectrally efficient than other modulation techniques, such as on-off keying.

In further accordance with the invention, a method for recovering information from a composite optical signal includes the following steps. The composite optical signal, which has at least two subbands of information and at least one tone, is received. The composite optical signal is split into at least two optical signals, each including a different subband and one of the tones. For each optical signal, an optical local oscillator signal is also received. Each optical signal is detected using heterodyne detection and the optical local oscillator, resulting in an electrical signal which includes a frequency down-shifted version of the subband and the tone of the optical signal. The frequency down-shifted subband is mixed with the frequency down-shifted tone to produce a frequency component containing the information.

In another aspect of the invention, the method further includes encoding the information in the composite optical signal and then transmitting the composite optical signal across an optical fiber, to be received and processed as described above. In one embodiment, the information is encoded by receiving an optical carrier and modulating the optical carrier with the information using a raised cosine modulation biased at a point slightly offset from a $V_\pi$ point.

BRIEF DESCRIPTION OF THE DRAWING

The invention has other advantages and features which will be more readily apparent from the following detailed description of the invention and the appended claims, when taken in conjunction with the accompanying drawing, in which:

FIG. 6 is a block diagram of one embodiment 690 of signal extractor 190 based on squaring a signal containing a tone and a sideband;

FIG. 7 is a block diagram of another embodiment 790 of signal extractor 190 based on multiplying a tone with a sideband;

FIGS. 13A–13E are graphs illustrating the spectra of various signals in system 1200;

FIGS. 15A–15D are graphs illustrating the spectra of various example composite signals.

DETAILED DESCRIPTION OF THE PREFERRED EMBODIMENTS

Figure 1:
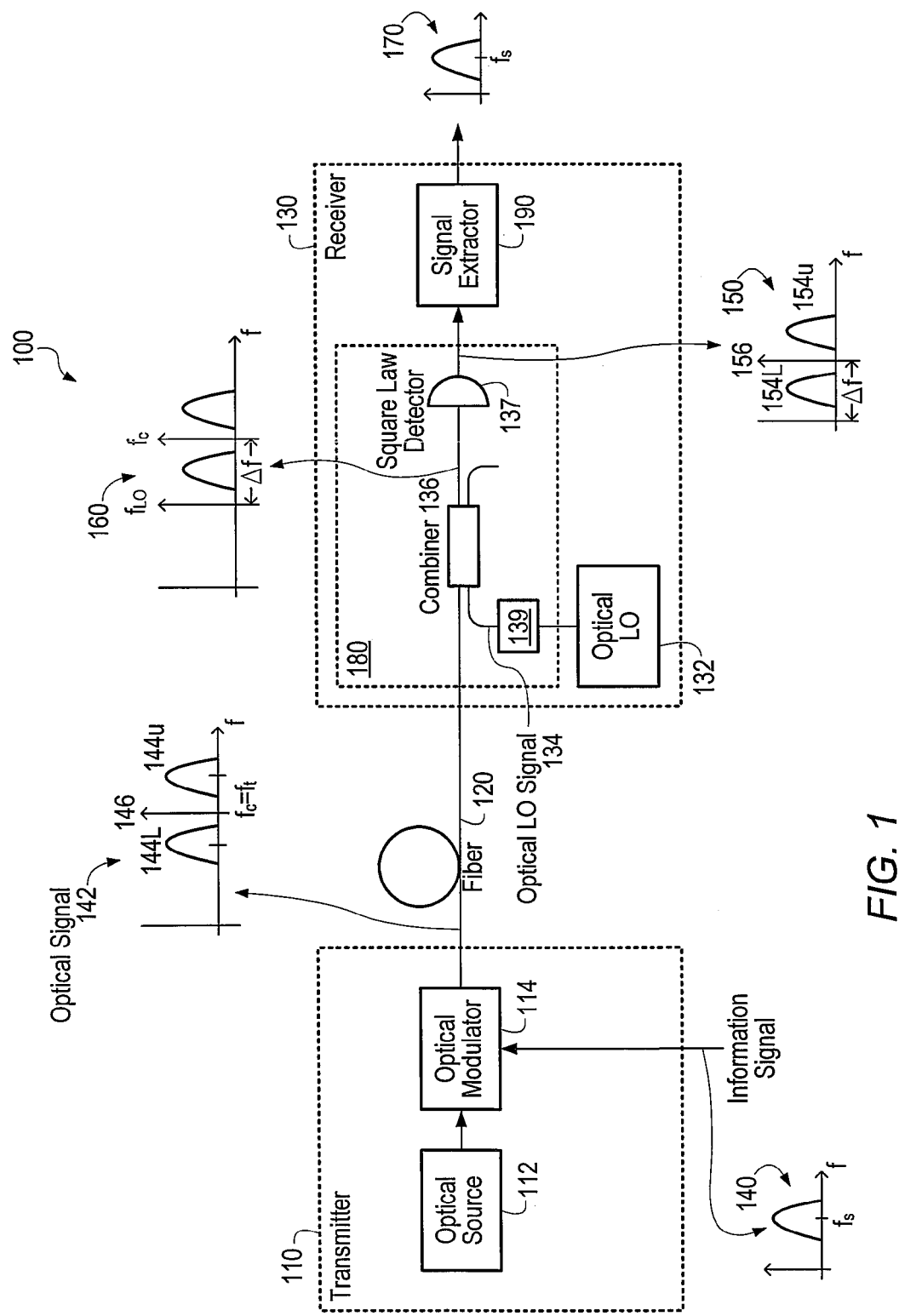
FIG. 1 is a block diagram of a system 100 according to the present invention.

FIG. 1 is a diagram of a system 100 according to the present invention. System 100 includes a transmitter 110 coupled to a receiver 130 by optical fiber 120. The receiver 130 preferably includes a heterodyne detector 180 coupled to a signal extractor 190. System 100 is used to transmit an information signal from transmitter 110 to receiver 130 via fiber 120.

Figure 2:
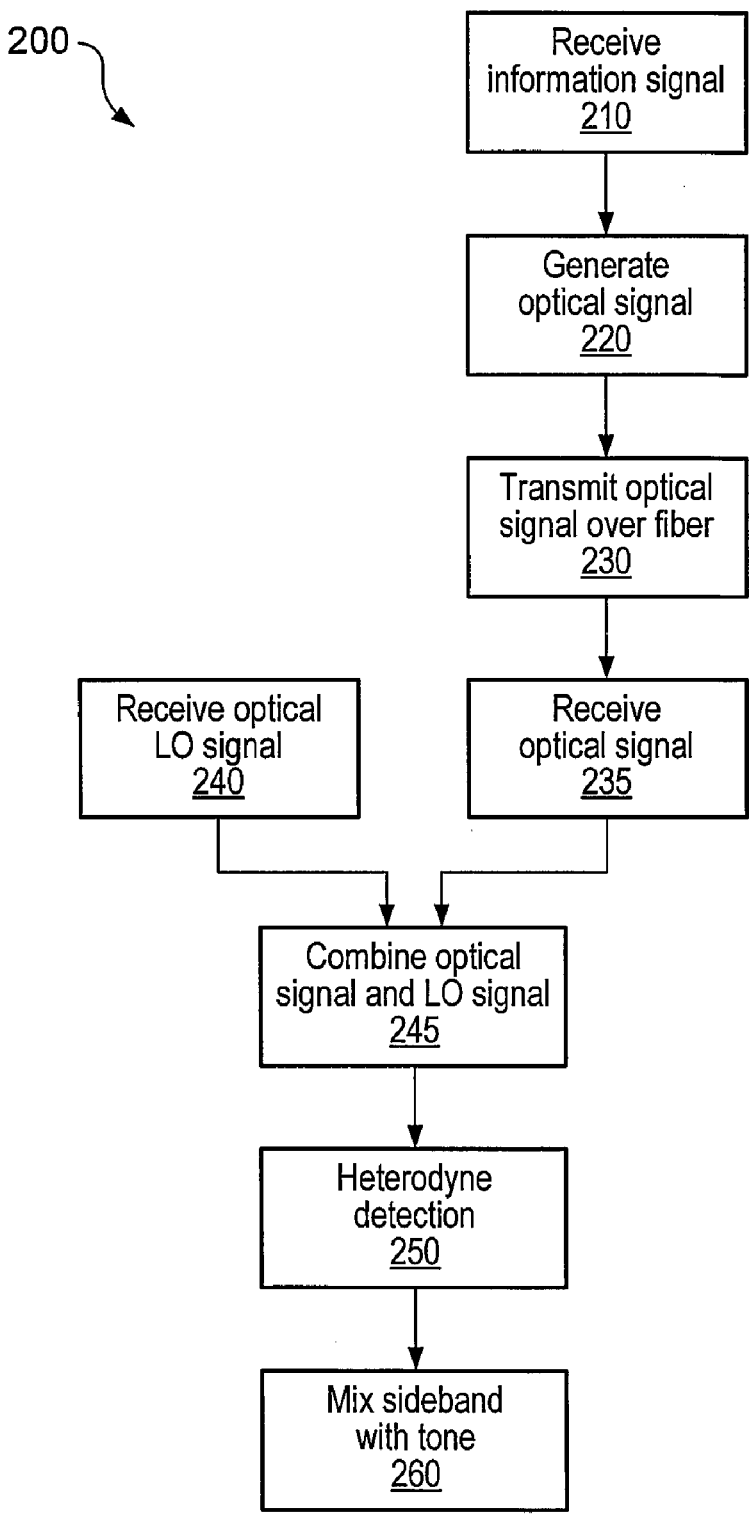
FIG. 2 is a flow diagram illustrating a method 200 for transmitting an information signal across a fiber, according to the present invention.

With reference to the flow diagram of FIG. 2 as well as to FIG. 1, system 100 operates as follows. The frequency spectrum of an example information signal is shown by spectrum 140, which is characterized by a frequency $f_S$. The frequency $f_S$ could be zero, for example, if the information signal is based on on-off keying. The information signal 140 may be any of a variety of signals. For example, it may be a single high speed data stream. Alternately, it may contain a number of data streams which are time-division multiplexed together, for example, if 64 OC-3 data streams are combined together to form a single OC-192 signal, which serves as the information signal 140. As another example, the information signal may include a number of constituent signals, each of which occupies a different frequency band within spectrum 140. In other words, the constituent signals may be frequency division multiplexed together. Other types of information signals 140 and methods for combining constituent signals to form the information signal 140 will be apparent.

Transmitter 110 receives 210 the information signal 140 and generates 220 an optical signal 142. Optical signal 142 is characterized by a carrier frequency $f_C$ and includes at least one sideband 144 based on the information signal 140 and at least one tone 146, shown at a frequency $f_t$ in the following examples. Various techniques may be used to achieve this function. In a preferred embodiment, transmitter 110 includes an optical source 112 coupled to an optical modulator 114. Examples of optical sources include solid state lasers and semiconductor lasers. Example optical modulators 114 include Mach Zehnder modulators, electro-optical modulators, and electro-absorptive modulators. The optical source 112 produces an optical carrier at the carrier frequency $f_C$. The modulator 114 receives 210 the information signal 140 and modulates the optical carrier with the information signal 140 to generate 220 optical signal 142. In the example of FIG. 1, double sideband modulation is illustrated, resulting in two sidebands (upper sideband 144U and lower sideband 144L) which are centered about the carrier frequency $f_C$. Other types of modulation, such as single sideband modulation, could also be used. Continuing this example, the modulator 114 also produces a significant signal at the carrier frequency $f_C$, which serves as a tone 146. Alternately, transmitter 110 may include an internally modulated laser. In this case, the information signal 140 drives the laser, the output of which is the optical signal 142.

The optical signal 142 is transmitted 230 over fiber 120 to receiver 130. Current optical fibers have two spectral regions which are commonly used for communications: the 1.3 and 1.55 micron regions. At a wavelength of 1.3 micron, transmission of the optical signal is primarily limited by attenuation in the fiber 120; dispersion is less of a factor. Conversely, at a wavelength of 1.55 micron, the optical signal will experience more dispersion but less attenuation. Hence, the optical signal preferably has a wavelength either in the 1.3 micron region or the 1.55 micron region and, for long distance communications systems, the 1.55 micron region is generally preferred.

At receiver 130, heterodyne detector 180 receives 235 the incoming optical signal 142 and also receives 240 an optical local oscillator signal 134 at a frequency $f_{LO}$. In FIG. 1, the local oscillator signal 134 is shown at a frequency $f_{LO}$ which is lower than the carrier frequency $f_c$, but the local oscillator signal 134 may also be located at a frequency $f_{LO}$ which is higher than the carrier frequency $f_c$. Examples of optical local oscillators 132 include solid state lasers and semiconductor lasers. The optical signal 142 and local oscillator signal 134 are combined 245 and heterodyne detection 250 of the combined signal effectively downshifts the optical signal 142 from a carrier at frequency $f_c$ to a frequency $\Delta f$, which is the difference between the local oscillator frequency $f_{LO}$ and the carrier frequency $f_c$. The resulting electrical signal has spectrum 150. Note that both sidebands 154L and 154U, and tone 156 have also been frequency downshifted compared to optical signal 142. Signal extractor 190 then mixes 260 at least one of the sidebands 154 with one of the tones 156 to produce a number of frequency components, including one frequency component 170 located at the difference frequency $\Delta f$ between the relevant sideband 154 and tone 156. This difference component 170 contains the information signal 140, although it may be offset in frequency from the original frequency $f_s$, depending on the frequencies of the sideband 154 and tone 156. Frequency components other than the difference component 170 may be used to recover the information signal. For example, the mixing 260 typically also produces a sum component located at the sum of the frequencies of the relevant sideband 154 and tone 156, ant the information signal 140 may be recovered from this sum component rather than the difference component. If more than one sideband 154 is processed by signal extractor 190, each sideband 154 is processed separately from the others in a manner which prevents destructive interference between the sidebands.

However, recovering the information signal 140 based on the difference component of sideband 154 and tone 156 is advantageous because it results in noise cancellation. For example, sideband 154L and tone 156 are affected similarly by laser phase noise produced by optical source 112 and optical local oscillator 132. Using the difference component effectively subtracts the laser phase noise in sideband 154L from the laser phase noise in tone 156, resulting in significant cancellation of this noise source. In contrast, using the sum component would effectively reinforce the laser phase noise.

Processing the sidebands 154 separately from each other is also advantageous because it significantly reduces dispersion effects caused by fiber 120. For example, in direct detection receivers, upper and lower sidebands 154U and 154L would be processed together and, at certain frequencies for the sidebands 154 and lengths of fiber 120, the dispersion effects of fiber 120 would cause the two sidebands to destructively interfere, significantly impairing the recovery of information signal 140. By processing sidebands 154 separately from each other, signal extractor 190 avoids this deleterious dispersion effect.

In a preferred embodiment, heterodyne detector 180 includes a combiner 136 and a square law detector 137 coupled in series. Combiner 136 preferably is a fiber coupler, due to its low cost and applicability to fiber systems, although other types of combiners may be used. Square law detector 137 preferably is a PIN diode. Combiner 136 receives 235 the incoming optical signal 142 at one of its inputs and receives 240 the optical local oscillator signal 134 at the other input. Combiner 136 combines the local oscillator signal 134 with the optical signal 142 to produce the combined signal with spectrum 160. Heterodyne detector may also include a polarization controller 139 coupled to the combiner 136 for matching the polarizations of the optical signal 142 and the local oscillator signal 134 so that the two signals are mixed efficiently at the square law detector 137. In FIG. 1, the polarization controller 139 is shown located between the local oscillator 132 and combiner 136 and controls the polarization of the local oscillator signal 134. Alternately, the polarization controller 139 may be located between the fiber 120 and combiner 136 and control the polarization of the optical signal 142. In another approach, polarization controller 139 may control the polarizations of both signals 134 and 142. Square law detector 137 produces a photocurrent which is proportional to the intensity of signal 160, which effectively mixes together the various frequency components in spectrum 160. The resulting electrical signal has a number of frequency components located at different frequencies, with the components of interest shown by spectrum 150. Spectrum 150 is similar to spectrum 142, but frequency downshifted from the carrier frequency $f_C$ to the difference frequency $\Delta f$.

Figure 3:
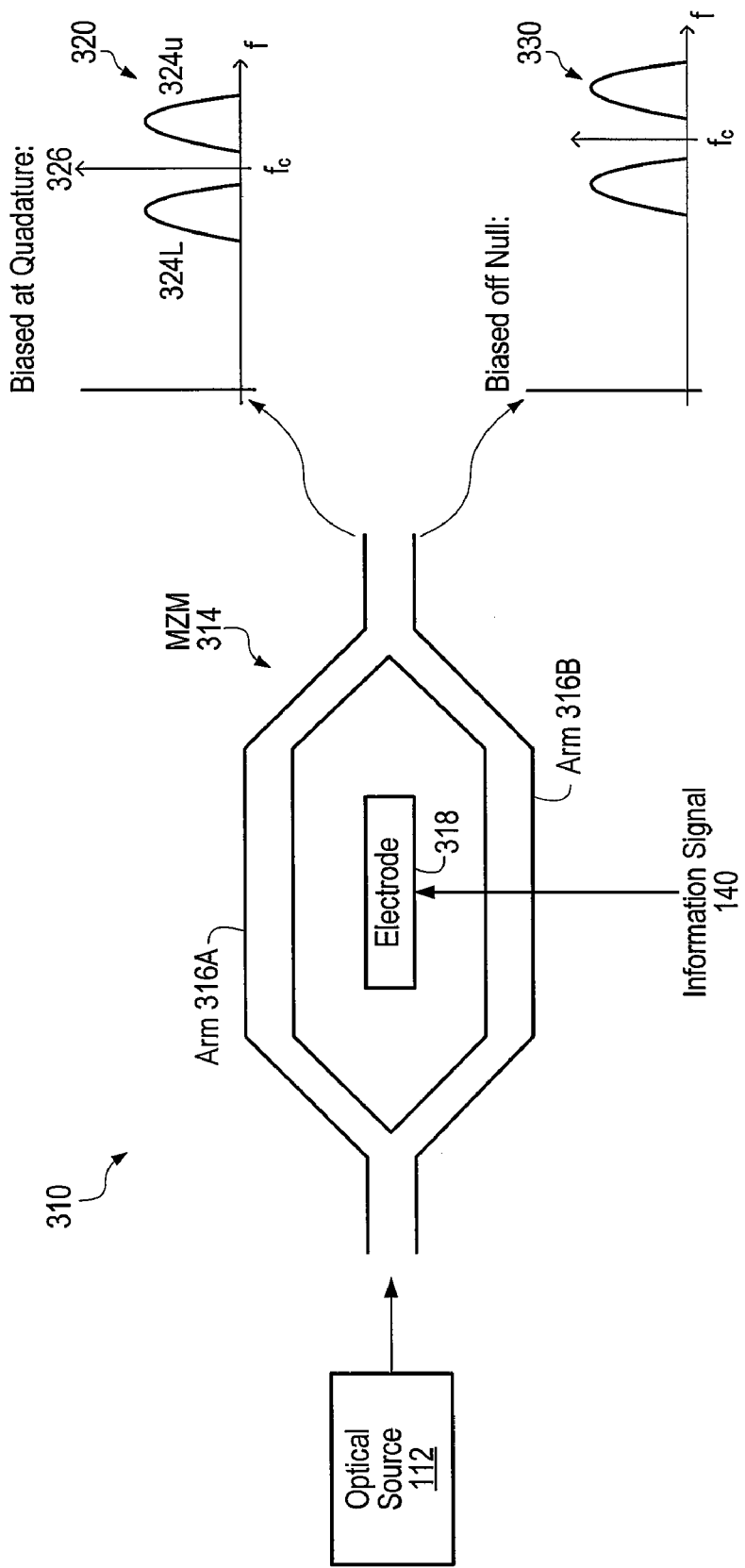
FIG. 3 is a diagram of one embodiment 310 of transmitter 110 using a Mach-Zender modulator.
Figure 4:
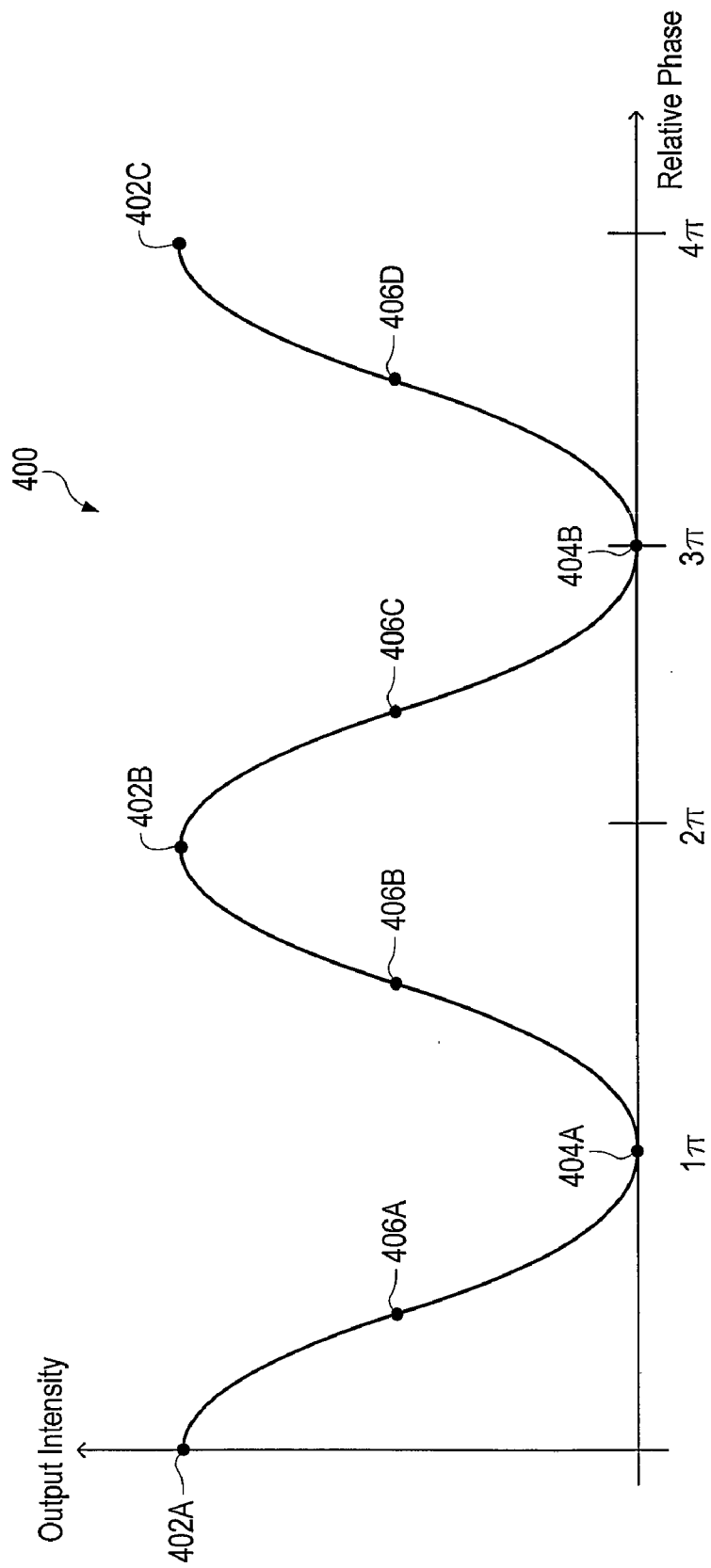
FIG. 4 is a graph illustrating a transfer function 400 for MZM 314.
Figure 5:
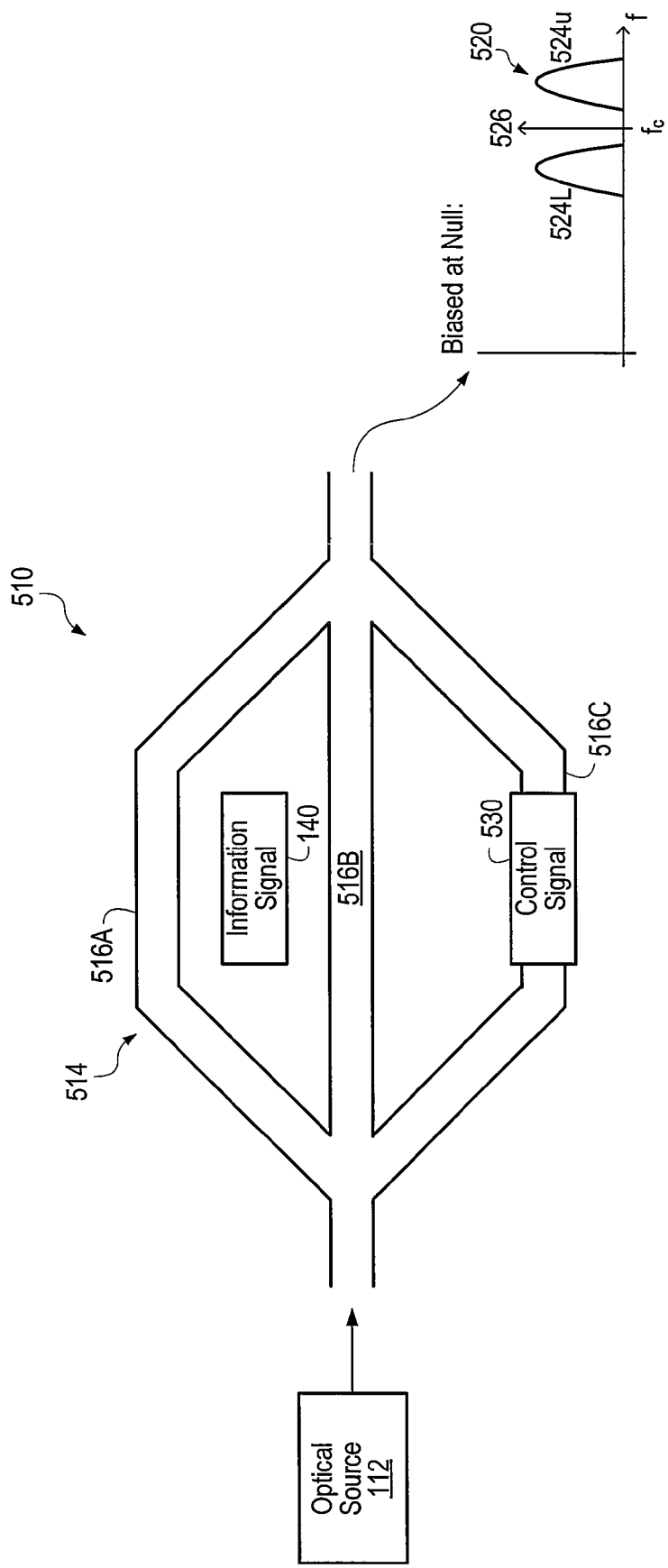
FIG. 5 is a diagram of another embodiment 510 of transmitter 110 using a three-armed modulator.

FIGS. 3–5 illustrate various embodiments of transmitter 110 and FIGS. 6–9 are examples of various embodiments of signal extractor 190. These embodiments are illustrated using the example of FIG. 1 in which optical signal 142 includes two sidebands 144 and the optical carrier functions as a tone 146. The invention, however, is not limited to this specific example. Modulation schemes besides double sideband may be used (e.g., single sideband). Similarly, the tone 146 may be located at frequencies other than the carrier frequency $f_c$ and/or multiple tones 146 may be used.

FIG. 3 is a diagram of one embodiment 310 of transmitter 110, in which modulator 114 includes a Mach-Zender modulator (MZM) 314. MZM 314 includes two arms 316A and 316B, and an electrode 318 for receiving information signal 140. The optical carrier produced by source 112 is received by MZM 314, which splits it into two signals, one propagating through each arm 316. The information signal 140 applied to electrode 318 produces an electric field across each of the arms 316, causing a difference in the optical path through each arm 316 (e.g., due to the electro-optic effect). As a result of this difference in optical path, the optical signals propagating through the two arms 316A and 316B will either constructively or destructively interfere when they are recombined at the output of the MZM 314. In other words, the output of MZM 314 depends on the relative phase difference between the two arms 316, which in turn depends on information signal 140.

FIG. 4 graphs the intensity of MZM 314 as a function of the relative phase shift between the two arms 316. Since MZM 314 is interferometric, the intensity of its optical output is a sinusoidal function of the relative phase shift between the two arms 316. For example, if the relative phase shift between the two arms 316 is a multiple of $2\pi$, then the signals in the two arms will constructively interfere, yielding a maximum intensity at the output as indicated by points 402A–402C. At the other extreme, two arms 316 which are out of phase will destructively interfere, yielding a minimum intensity at the output as shown by points 404A–404B, which shall be referred to as $V_\pi$ points. The interim cases result in the raised cosine transfer function 400 of FIG. 4. As described above, the relative phase shift is determined by the received information signal 140.

In one aspect of transmitter 310, the MZM 314 is biased at one of the quadrature points 406A–406D. At these quadrature points 406, the raised cosine transfer function may be used to approximates a linear transfer function, particularly if the modulator 314 is operated over a limited range around the quadrature points 406. When operated in this fashion, transmitter 310 results in the optical signal shown in spectrum 320. The raised cosine nature of transfer function 400 results in dual sidebands 324L and 324U; and operation at the quadrature point 406 results in a large signal at the carrier frequency $f_C$, which may be used as a tone 326.

FIG. 5 is a diagram of another embodiment 510 of transmitter 110, in which the optical modulator 114 includes a three-armed modulator 514. Modulator 514 includes three arms 516A–516C. Two arms 516A–516B form a conventional MZM and information signal 140 modulates the signal in these two arms in the same manner as MZM 314 of FIG. 3. However, the MZM formed by arms 516A–516B is not biased at one of the quadrature points 406. Rather, it is operated at one of the $V_\pi$ points 404. The result is an optical signal which includes two sidebands 524L and 524U but no optical carrier at $f_C$ since operation at the $V_\pi$ point 404 suppresses the carrier. The third arm 516C is used to reintroduce the optical carrier, preferably in a controlled manner by adjusting both the amplitude and phase of the carrier. For example, the amplitude and phase could be determined by adjusting the splitting ratios between the three arms 516 and/or the lengths of the arms 516, respectively. Alternatively, control signal 530 could be used to adjust elements in arm 516C which control the amplitude and phase of the carrier in the arm. This may be accomplished by using, for example, separate phase and amplitude modulation elements. The reintroduced carrier then functions as a tone 526 in optical signal 520. This approach is advantageous compared to transmitter 314 because the amplitude and phase of optical carrier 526 may be tailored for different purposes. For example, since optical carriers 526 and 326 do not carry any information, the amplitude of carrier 526 may be minimized to reduce wasted power whereas the amplitude of carrier 326 is fixed by quadrature point 406.

A similar result may be obtained by various other approaches. For example, the third arm 516C may be replaced by an optical fiber. Some of the optical carrier produced by source 112 is diverted to the optical fiber and then recombined with the output produced by the MZM formed by arms 516A–516B. In another approach, the MZM formed by arms 516A–516B may be biased at a point other than the $V_\pi$ point 404, thus producing an optical carrier. However, the phase and/or amplitude of the unmodulated carrier in arm 516C may be adjusted so that it interferes with the carrier produced by arms 516A–516B to generate an optical carrier with a desirable amplitude. The net result is an optical carrier of reduced amplitude. Alternatively, referring again to FIG. 3, MZM 314 may be biased at a point close to but slightly offset from the $V_\pi$ points 404. The slight offset will result in some carrier being introduced into the optical signal, thus resulting in a spectrum 330 with a reduced optical carrier as in spectrum 520.

FIG. 6 is a block diagram of one embodiment 690 of signal extractor 190 based on squaring a signal containing a tone and a sideband. Signal extractor 690 includes a bandpass filter 610, a square law device 620, and a low pass filter 630 coupled in series. The filters 610, 630 may be implemented in many different ways, for example, by a DSP chip or other logic device implementing a digital filter, a lump LC filter, a surface acoustic wave filter, a crystal-based filter, a cavity filter, or a dielectric filter. Other implementations will be apparent. The square law device 620 also may be implemented in many different ways. A diode is one common implementation.

Signal extractor 690 recovers the information signal 140 from electrical signal 150 as follows. Bandpass filter 610 frequency filters one of the sidebands and one of the tones from electrical signal 150. In this example, signal 150 includes two sidebands 154 and an optical carrier 156. Bandpass filter 610 passes the upper sideband 154U and the optical carrier 156, and blocks the lower sideband 154L, thus producing spectrum 660. The square law device 620 squares the filtered components 660, resulting in spectrum 670. Spectrum 670 includes frequency components 672 located at the difference of frequencies between sideband 154U and tone 156, and also frequency components 674 located at the sum of these frequencies. Low pass filter 630 selects the difference components 672, thus recovering the information signal 140.

As noted previously, selection of the difference components 672 rather than the sum components 674 is advantageous because it effectively cancels any noise sources which are common to both the tone 156 and sideband 154. In addition, processing a single sideband 154U, rather than both sidebands 154U and 154L together, prevents any potential destructive interference between the sidebands, as may be caused by the frequency dispersion effects discussed previously.

FIG. 7 is a block diagram of another embodiment 790 of signal extractor 190 based on multiplying a tone with a sideband. This extractor 790 includes two bandpass filters 710 and 712, a multiplier 720 and a low pass filter 730. The two bandpass filters 710, 712 are each coupled to receive the incoming electrical signal 150 and are coupled on their outputs to multiplier 720. The multiplier is coupled to low pass filter 730.

Bandpass filter 710 selects a tone 156 and bandpass filter 712 selects one of the sidebands 154. In this specific example, the optical carrier and upper sideband 154U are the selected components. Multiplier 720 multiplies the tone 156 against the selected sideband 154U, resulting in a signal with a sum component 774 and a difference component 772, as in FIG. 6. Low pass filter 730 selects the difference component 772, thus recovering the information signal 140.

Figure 8:
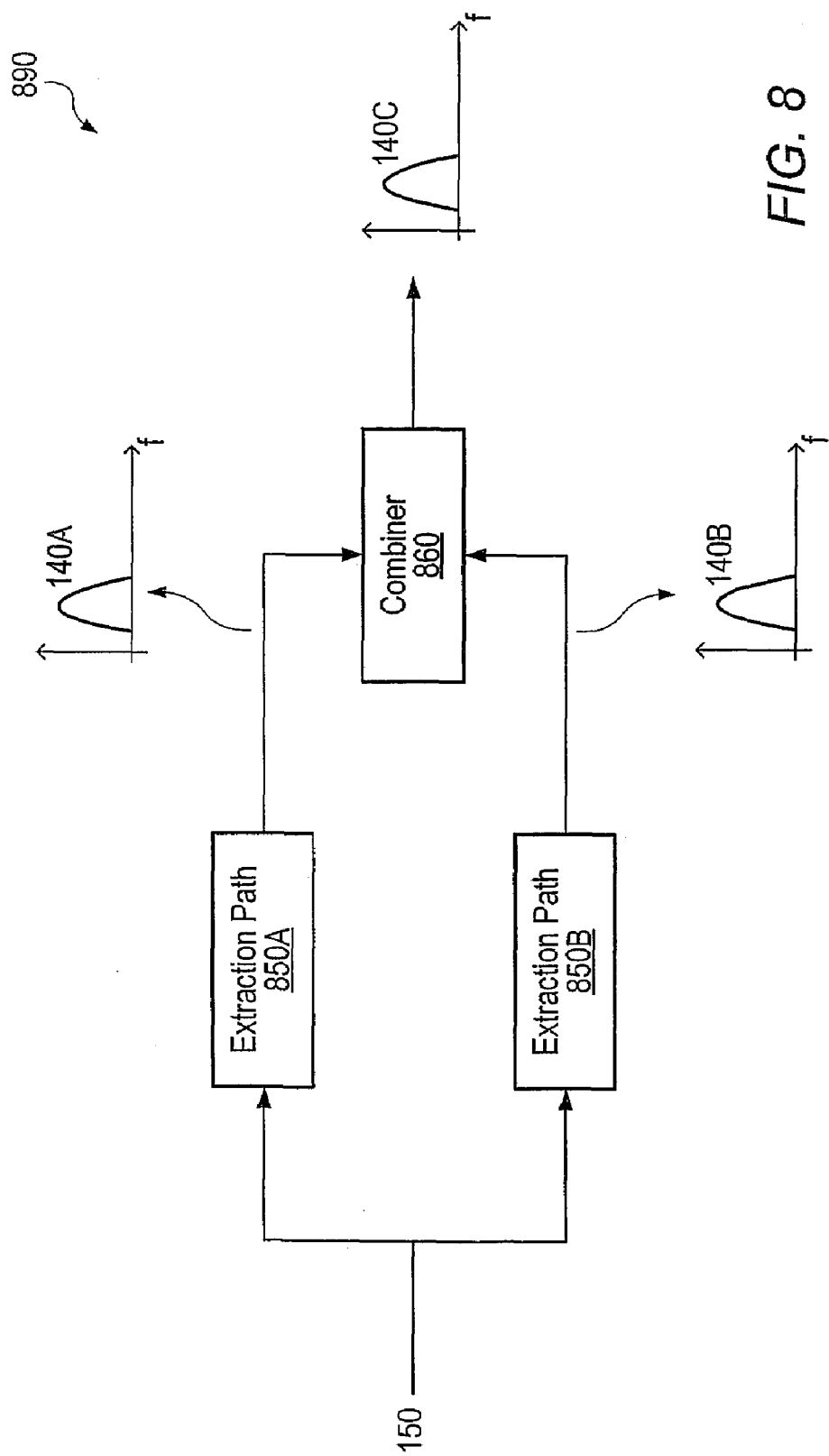
FIG. 8 is a block diagram of yet another embodiment 890 of signal extractor 190 using separate extraction paths to process different sidebands.

FIG. 8 is a block diagram of yet another embodiment 890 of signal extractor 190 using separate extraction paths for different sidebands. Example 890 includes two extraction paths 850A and 850B, and a combiner 860. Each extraction path 850 receives the incoming electrical signal 150 and is coupled on the output side to combiner 860.

Each extraction path 850 processes a different sideband within the electrical signal 150 to recover information signals 140A and 140B, respectively. As an example, extraction path 850A might process the upper sideband 154U; whereas extraction path 850B processes the lower sideband 154L. Both extraction paths 850 may use the same tone (e.g., the optical carrier) in their processing, or they may use different tones. Combiner 860 receives the recovered information signals 140A and 140B and constructively combines them to produce a resultant difference component 140C, which contains the original information signal. The difference components 140A and 140B typically may be phase shifted with respect to each other in order to align their phases before they are combined; the amount of the phase shift may be frequency-dependent. If difference components 140 are located at difference frequencies, combiner 860 may also frequency shift them to a common frequency before combining.

In a preferred embodiment, each path 850 is based on the approach of signal extractor 690 of FIG. 6, except that each extraction path 850 is designed to process a different sideband. Thus, for example, the bandpass filter 610 for extraction path 850A may be tuned to select the optical carrier and upper sideband 154U; whereas the bandpass filter 610 for extraction path 850B might select the optical carrier and lower sideband 154L. Alternately, each extraction path 850 may be based on the approach of signal extractor 790 of FIG. 7.

Figure 9:
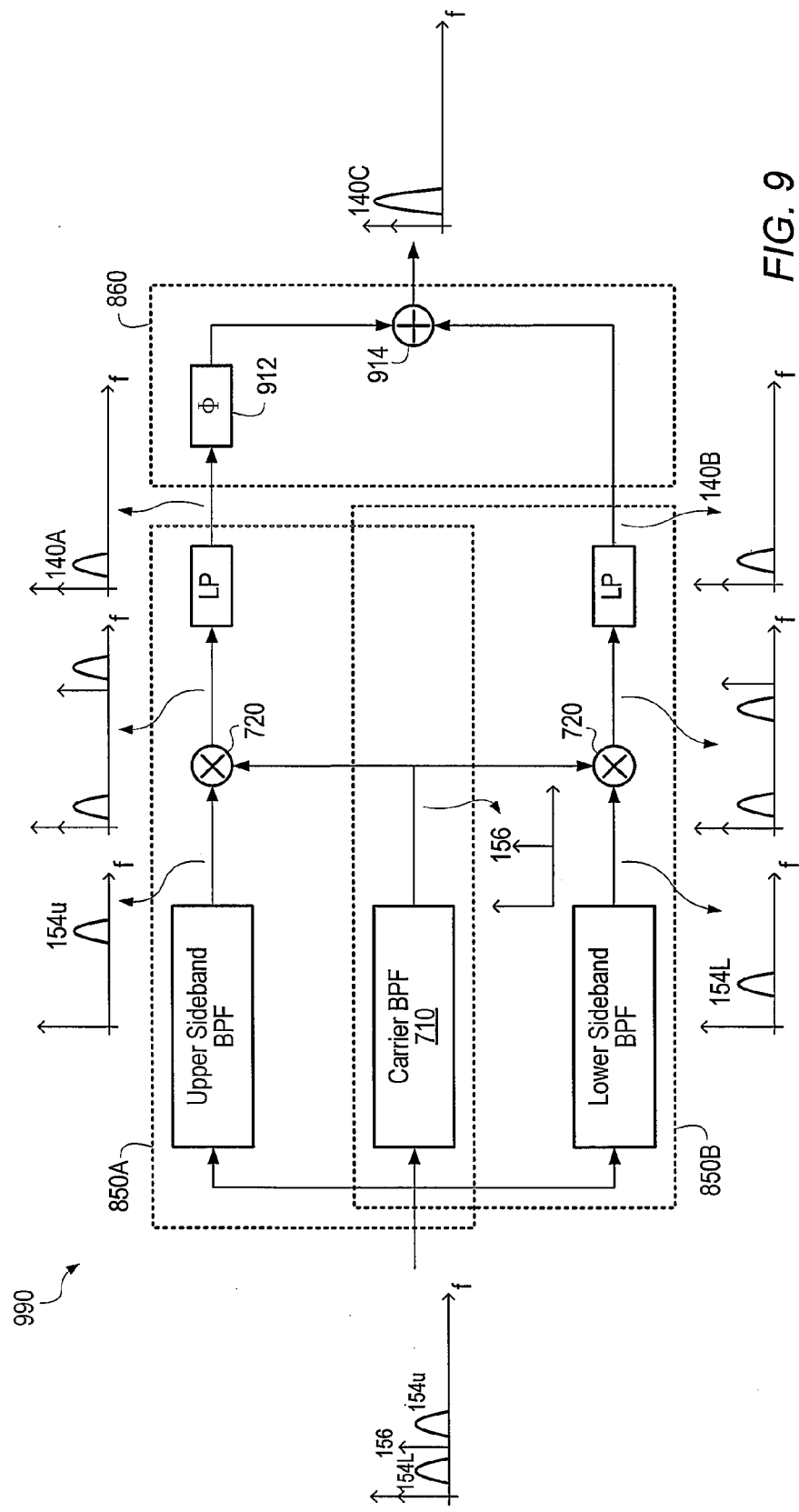
FIG. 9 is a block diagram of one embodiment 990 of signal extractor 890 based on multiplying a tone with a sideband.

FIG. 9 is a block diagram of one embodiment 990 of signal extractor 890 in which the extraction paths 850 share components, although the sidebands are still processed separately. In this embodiment, each of the extraction paths 850 is based on signal extractor 790. Extraction path 850A processes the upper sideband 154U; whereas extraction path 850B processes the lower sideband 154L. Both extraction paths use the optical carrier as the tone 526. Hence, they may share a common bandpass filter 710, which selects the optical carrier. In other words, the extraction paths are overlapping. The tone 526 is then fed to both multipliers 720 in each respective extraction path 850.

Combiner 860 includes a phase shifting element 912 and an adder 914. Phase shifting element 912 phase shifts the difference component 140A produced by extraction path 850A so that it is in phase with the difference component 140B produced by extraction path 850B. Adder 914 then adds the two in-phase components to produce the resulting difference component 140C.

Figure 10:
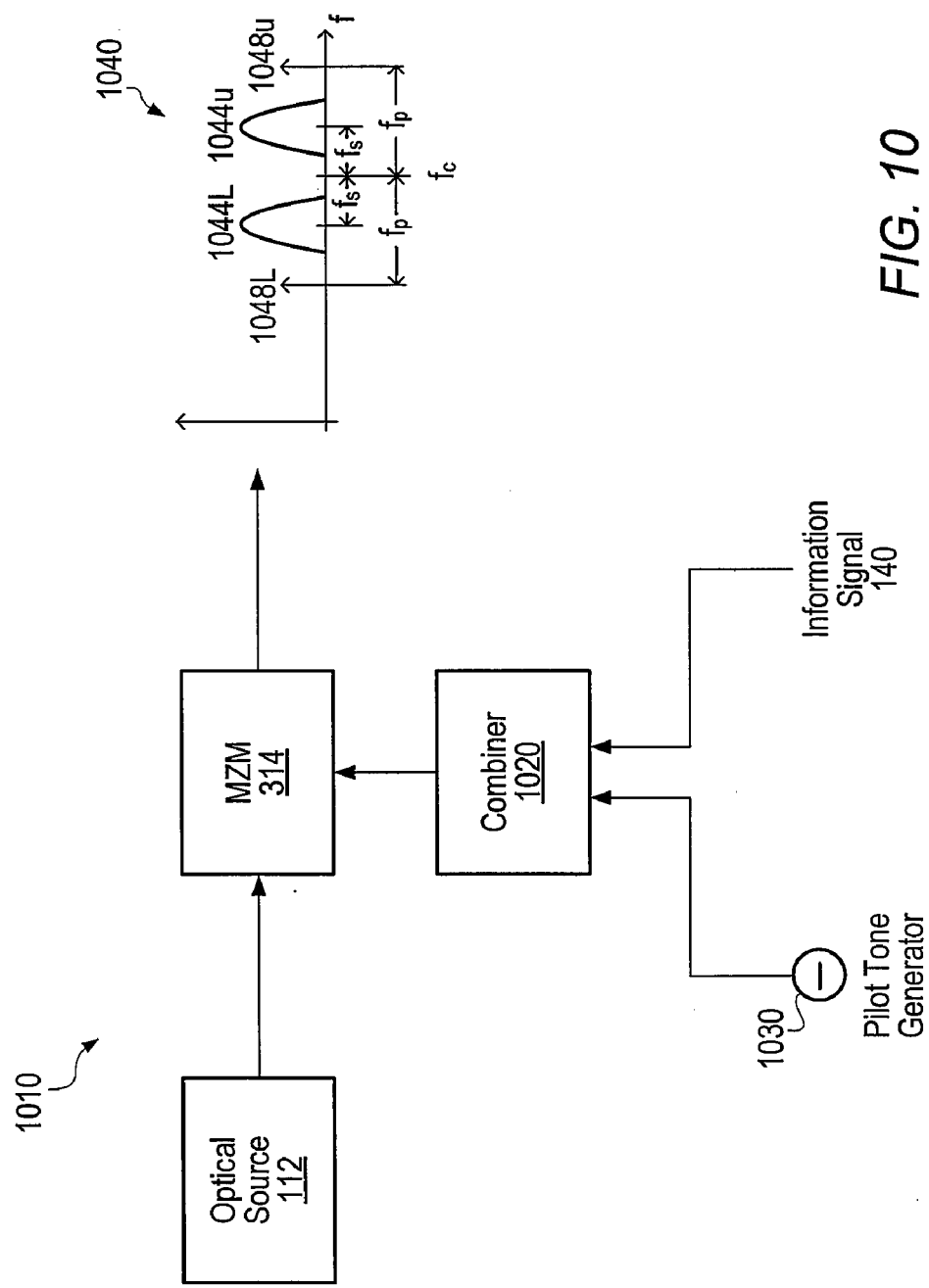
FIG. 10 is a diagram of another embodiment 1010 of transmitter 110 using pilot tones.

In FIGS. 3–9, the optical carrier played the function of the tone 146. FIG. 10 illustrates an example in which a tone 146 is located at a frequency other than the carrier frequency. In particular, FIG. 10 is a diagram of another embodiment 1010 of transmitter 100 using a pilot tone. Transmitter 1010 includes an optical source 112 coupled to an MZM 314 as in FIG. 3. However, transmitter 1010 also includes a combiner 1020 and a pilot tone generator 1030. The pilot tone generator 1030 is coupled to one input of combiner 1020, the output of which drives MZM 314. The other input of combiner 1020 receives information signal 140.

In transmitter 1010, combiner 1020 combines the pilot tone at a frequency $f_p$ with the incoming information signal 140 and uses the combined signal to modulate MZM 314. If MZM 314 is biased at the $V_\pi$ point, the resulting spectrum 1040 will include upper and lower sidebands 1044 of the information signal, upper and lower sidebands 1048 of the pilot tone, and no optical carrier. Each sideband 1048 of the pilot tone may be used by signal extractor 190 as a tone 146. In other words, the signal extractor may mix one of the pilot tones 1048 with one of the sidebands 1044 to recover the information signal 140.

All of the signal extractors 190 described above may be adapted for use with optical signal 1040. For example, referring to FIG. 6, bandpass filter 610 may be adjusted to select one of the sidebands 1044 and one of the pilot tones 1048. The square law device 620 would then produce a corresponding difference component 672. Since this difference component might not lie exactly as baseband, low pass filter 630 may also need to be adjusted in order to recover the correct frequency components. Similarly, referring to FIG. 7, extractor 790 may be adapted for use with signal 1040 by similarly adjusting the frequency bands for filters 710, 712, and 730 to select an appropriate sideband 1044, pilot tone 1048 and difference component 772, respectively. Similar adjustments may be made to the systems discussed in FIGS. 8 and 9. Transmitter 1010 and optical signal 1040 are merely illustrative, other combinations of tones and sidebands will be apparent.

Figure 11:
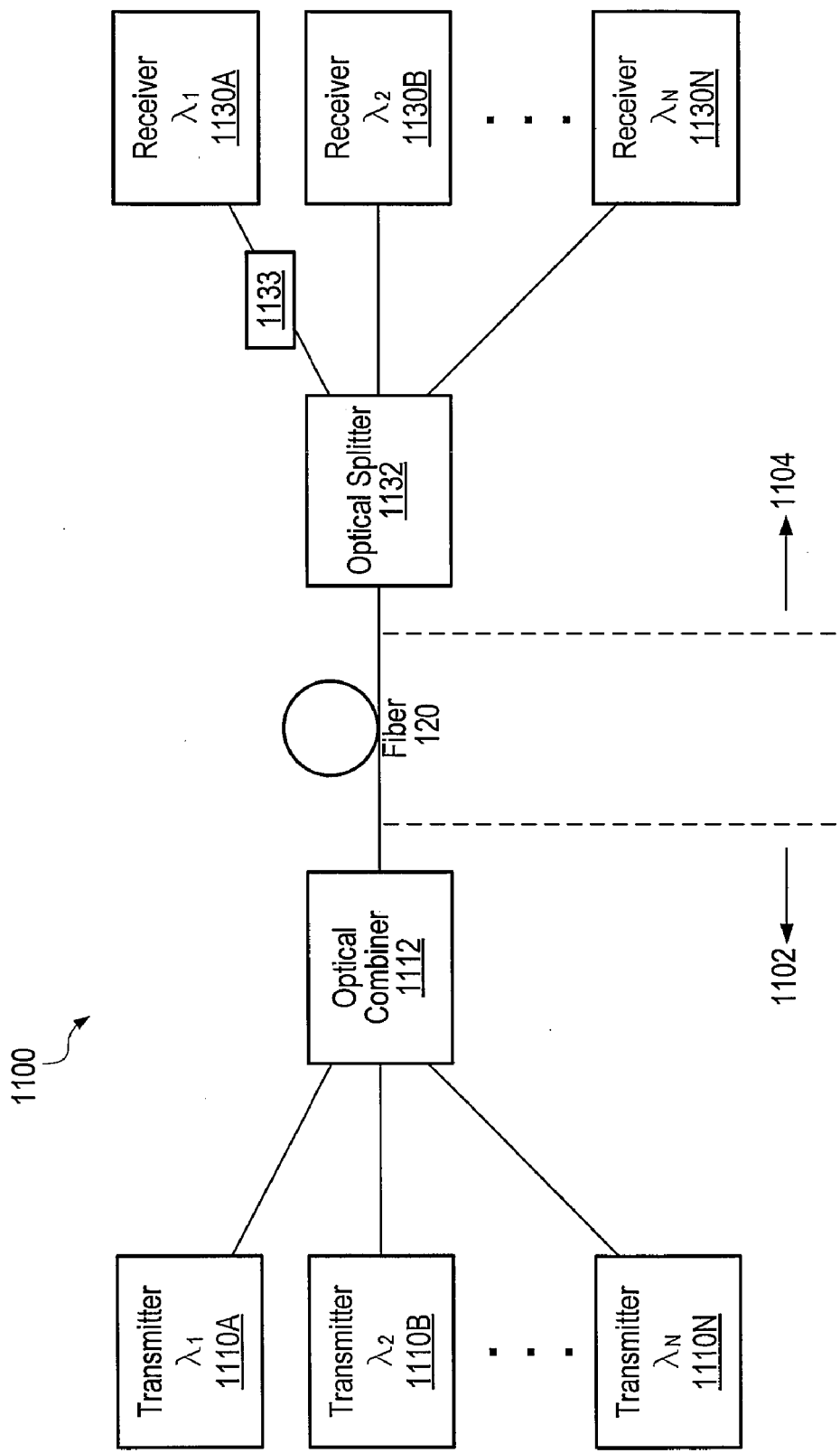
FIG. 11 is a block diagram of another system 1100 according to the invention.
Figure 12:
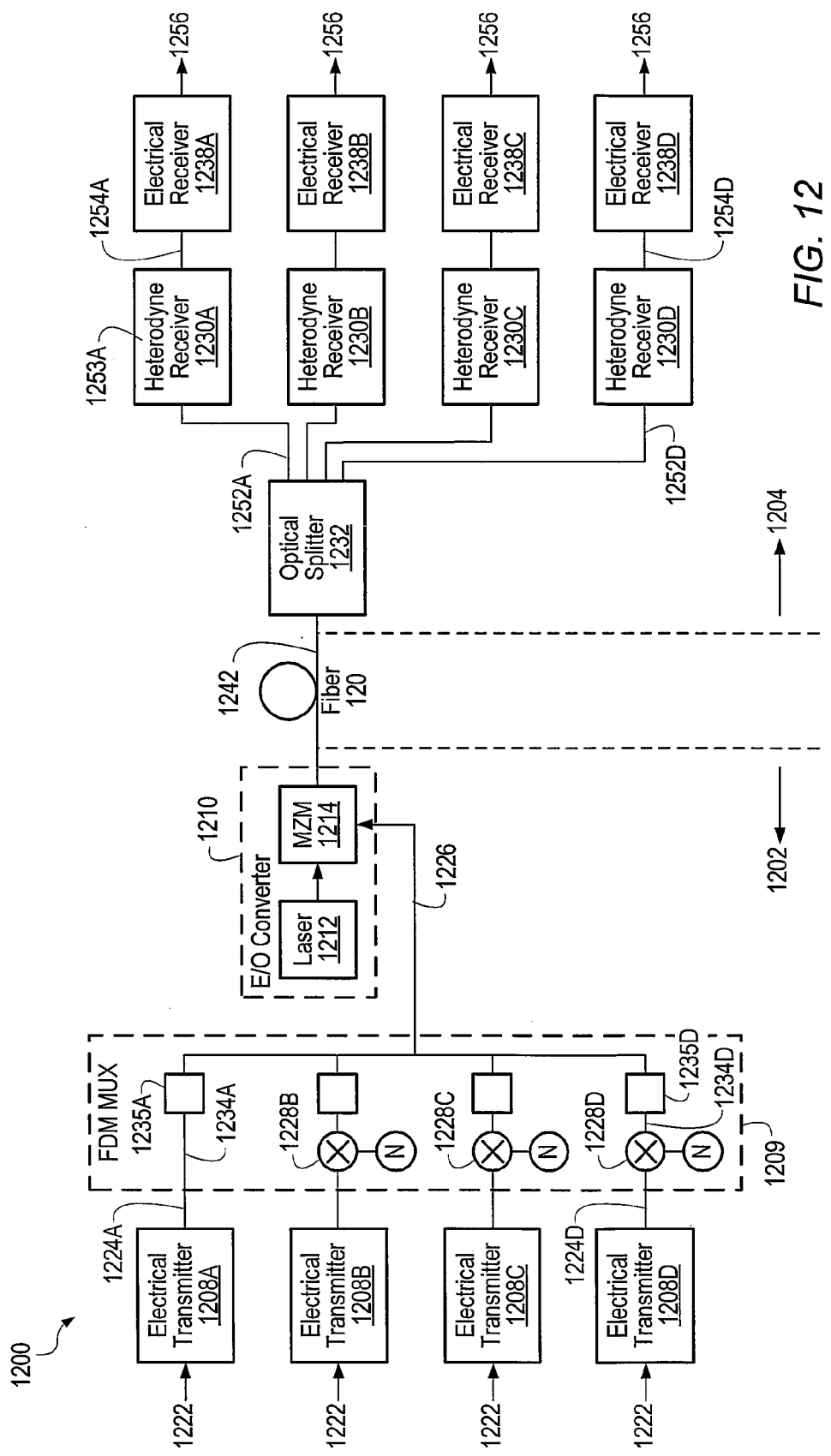
FIG. 12 is a block diagram of yet another system 1200 according to the invention.

FIGS. 11 and 12 are block diagrams of further example systems 1100 and 1200 according to the invention. Example system 100 used a single receiver 130 with a single optical local oscillator signal 134, in order to illustrate the basic principles of heterodyne detection. Systems 1100 and 1200 use multiple receivers, each using an optical local oscillator signal of a different frequency. As a result of these different frequencies, each receiver effectively is tuned to a specific wavelength band, thus automatically providing some wavelength selectivity. For clarity, in FIGS. 11 and 12, the term "heterodyne receiver" is used to describe receivers based on heterodyne detection, such as receiver 130 in FIG. 1 and its variants described in FIGS. 2–10.

In FIG. 11, system 1100 includes a transmitter subsystem 1102 coupled to a receiver subsystem 1104 via an optical fiber 120. Briefly stated, the transmitter subsystem 1102 encodes information to be transmitted onto an optical signal. For reasons which will become apparent below, this optical signal is referred to as a "composite optical signal." The composite optical signal is transmitted across the fiber 120 and received by the receiver subsystem 1104. The receiver subsystem 1104 recovers the original information from the composite optical signal.

Figure 14A:
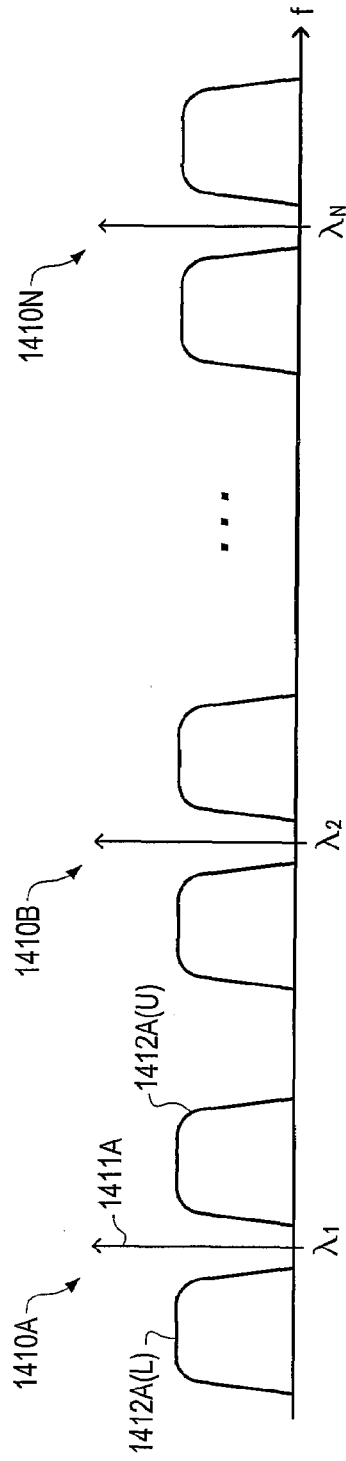
FIGS. 14A–14B are graphs illustrating the spectra of various signals in system 1100.
Figure 14B:
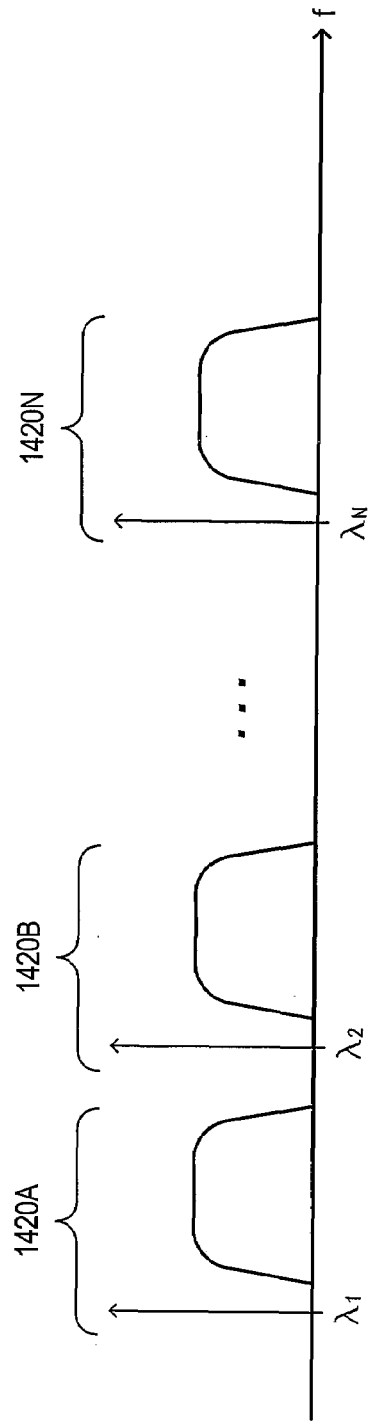

In more detail, the transmitter subsystem includes transmitters 1110A–1110N which are optically coupled to an optical combiner 1112. Transmitter 110 of FIG. 1 and its variants are suitable for use as a transmitter 1110. Each transmitter 1110 encodes information to be transmitted onto an optical signal which includes sideband(s) of information, as discussed previously in the context of FIG. 1, et seq. Each transmitter 1110 uses a different optical carrier frequency $\lambda_1$–$\lambda_N$ so as to spectrally separate the relevant sidebands of the various optical signals. Combiner 1112 optically combines the optical signals to produce the composite optical signal. Examples of combiners 1112 include N:1 power combiners (i.e., not wavelength selective) and WDM multiplexers. FIGS. 14A and 14B show spectra for two example composite optical signals. Referring first to FIG. 14A, transmitter 1110A produces double sideband signal 1410A. This signal includes optical carrier 1411A at wavelength $\lambda_1$ and an upper and lower sideband 1412A(U) and 1412A(L), respectively. Similarly, transmitter 1110B–1110N produce signals 1410B–1410N. For clarity, each of the sidebands 1412A–1412N will be referred to as subbands of the composite optical signal. The composite optical signal in FIG. 14B has a similar structure to that in FIG. 14A, except that the constituent optical signals 1420 are single sideband signals.

Thus, the composite optical signal includes at least two subbands of information, at least one from each of at least two transmitters 1110. The composite signal also includes at least one tone for use in the subsequent heterodyne recovery although it typically will contain more. As an example, if the optical carrier corresponding to each subband is used as the tone, then each transmitter will generate one tone and the composite optical signal will include a total of N tones. Each transmitter 1110 preferably generates the tone for the corresponding subbands.

On the receive side, the receiver subsystem 1104 includes an optical splitter 1132 coupled to heterodyne receivers 1130A–1130N. Ignore element 1133 for now. Again, receiver 130 of FIG. 1 and its variants are suitable for use as a receiver 1130. The optical splitter 1132 splits the composite optical signal into N optical signals, from which the encoded information is recovered. Each optical signal includes at least one subband and one tone, and each heterodyne receiver 1130 recovers the information from the subband using the heterodyne techniques described previously. More specifically, each heterodyne receiver 1130 uses an optical local oscillator at the appropriate frequency to select, if necessary, and process the appropriate subband and tone which it receives. In a preferred embodiment, there is a one-to-one correspondence between transmitters 1110 and receivers 1130. The optical local oscillator for receiver 1130A is selected to recover the subband produced by transmitter 1110A, which is located at an optical carrier frequency of $\lambda_1$. A similar relationship exists for the other transmitters 1110 and receivers 1130.

System 1100 implements an unconventional type of wavelength division multiplexing (WDM). Each of the optical signals generated by transmitters 1110 uses a different wavelength $\lambda_1$–$\lambda_N$. These different wavelength signals are combined and then transmitted over a single fiber 120. At the receiver subsystem 1104, they are then separated by wavelength and separately processed. However, as a result of the inherent spectral selectivity and increased sensitivity of heterodyne detection, system 1100 is different from conventional WDM systems in many respects. For example, in a conventional WDM system, the wavelength separation is implemented entirely by optical splitter 1132, which would be a WDM demultiplexer. In system 1100, however, the heterodyne receivers 1130 are also wavelength selective. Thus, the optical crosstalk suppression requirements of the optical splitter 1132 can be less stringent than those required for conventional WDM systems.

For example, in certain applications, a standard 1:N power splitter is appropriate for optical splitter 1132. Note that a conventional 1:N power splitter simply splits an incoming signal into N outgoing signals, each with 1/N the power of the original signal. Furthermore, unlike a WDM demultiplexer, a power splitter is not wavelength selective and, therefore, also is not selective between optical signals located at different wavelengths. Thus, for example, a power splitter does not suppress crosstalk between signals at different wavelengths. As a result of the large power loss, the lack of wavelength selectivity and the corresponding lack of crosstalk suppression, power splitters generally are not preferred for conventional WDM systems. In system 1100, however, the use of heterodyne detection overcomes both of these limitations. The increased sensitivity of heterodyne receivers compensates for the large power loss. The use of an optical local oscillator (and subsequent electrical filtering) to select the subband and tone of interest compensate for the lack of wavelength selectivity and crosstalk suppression. In fact, heterodyne receivers can be more wavelength sensitive than current WDM demultiplexers, thus allowing the optical carriers used by transmitters 1110 to be more closely spaced than in conventional WDM systems. As an intermediate solution, optical splitter 1132 may have some wavelength selectivity. For example, it may be a conventional 1:N power splitter followed by broad wavelength filters, so that the optical signals entering each heterodyne receiver 1130 are somewhat attenuated in the unwanted wavelength bands. Referring to FIG. 11, a wavelength filter tuned to wavelength $\lambda_1$ may be located at 1133 in order to filter the signal received by receiver 1130A. This increases the wavelength selectivity and also increases the optical signal to noise ratio since out of band noise is reduced. Alternately, optical splitter 1132 may be a WDM demultiplexer which has a spectral response too wide for use in conventional WDM systems but which offers some improvement over a spectrally flat power splitter.

Figure 13A:
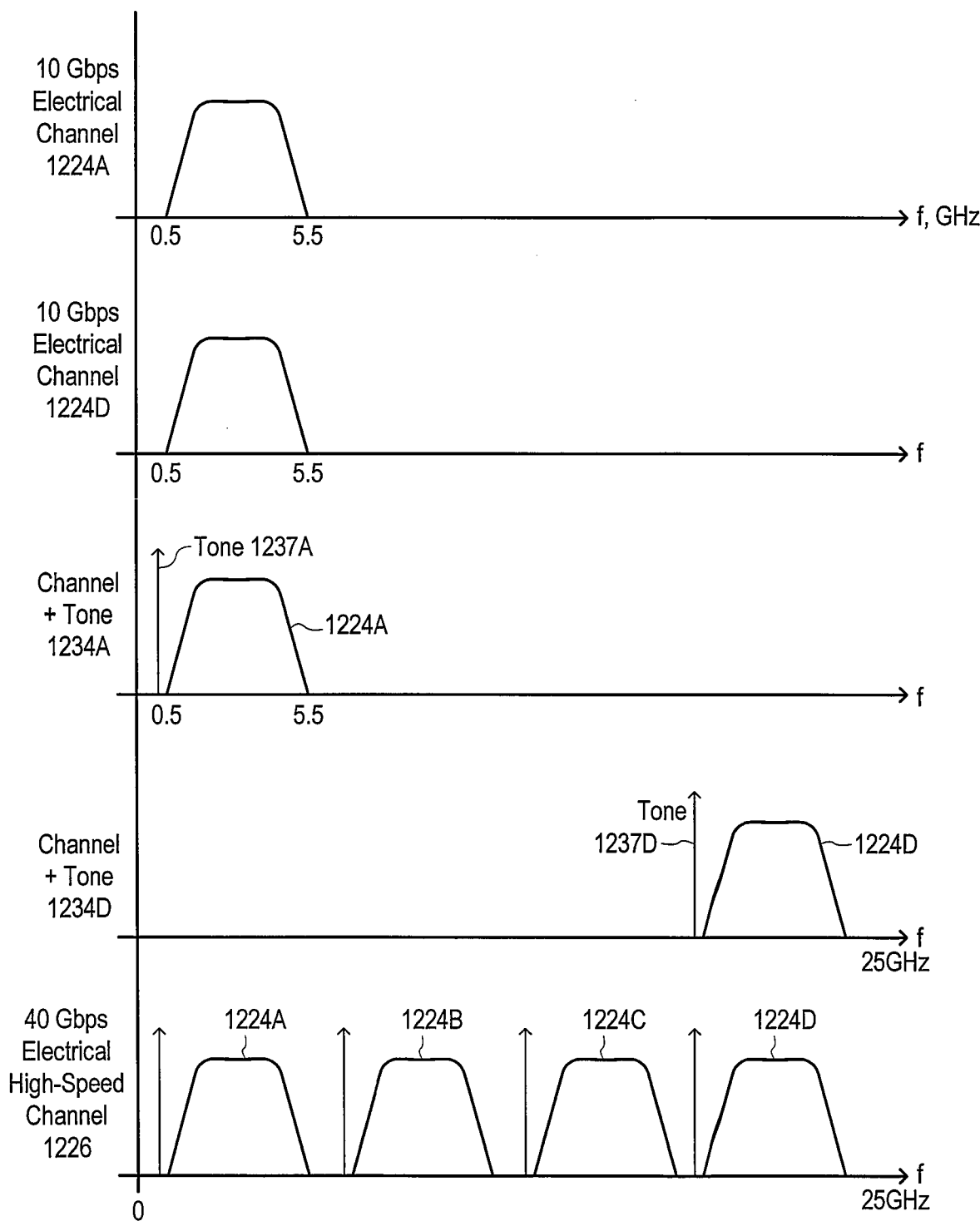

In FIG. 12, system 1200 is designed to transmit a composite optical signal of 40 billion bits per second (Gbps) of digital data across a single fiber. System 1200 includes a transmitter subsystem 1202 coupled to a receiver subsystem 1204 via an optical fiber 120. In system 1100 of FIG. 11, each transmitter 1110 received an electrical information signal and generated an optical signal with sidebands. The optical signals were then optically combined to produce the composite optical signal. In system 1200, the information signals and tones are electrically combined to produce an electrical high-speed channel, which is then converted to optical form to produce the composite optical signal. Approaches which use a mix of electrical and optical combining will be apparent. FIGS. 13A–13C illustrate the frequency spectra of various signals in system 1200. For clarity, only the relevant portions of these spectra are depicted in the figures.

In more detail, transmitter subsystem 1202 includes four electrical transmitters 1208A–1208D which are electrically coupled to an FDM multiplexer 1209, which in turn is coupled to transmitter 1210. Each electrical transmitter 1208 includes the same construction as element 245 in FIG. 6B of co-pending U.S. patent application Ser. No. 09/405,367, "Optical Communications Networks Utilizing Frequency Division Multiplexing," by Michael W. Rowan, et al., filed Sep. 24, 1999 (hereafter, the "FDM Application"). In brief, electrical transmitter 1208 includes a QAM modulator (included in element 640 of FIG. 6B) coupled to an FDM multiplexer (elements 642 and 644 in FIG. 6B). Each electrical transmitter 1208 receives 64 incoming electrical low-speed channels 1222, each of which has a data rate of 155 Mbps in this specific embodiment. The QAM modulator applies a QAM modulation to each incoming low-speed channel. The FDM multiplexer combines the QAM-modulated low-speed channels using FDM techniques to form an electrical channel 1224A–1224D which has a data rate of 10 Gbps and a width of approximately 5.5 GHz. The frequency spectra of signals 1224A and 1224D are shown in FIG. 13A. See also FIG. 10D, et seq. in the FDM Application.

The FDM multiplexer 1209 combines the four 10 Gbps channels 1224 into a single electrical signal, which for convenience will be referred to as the electrical high-speed channel 1226. It does this using conventional FDM techniques, frequency shifting some or all of the 10 Gbps channels 1224 to higher carrier frequencies. For example, referring again to FIG. 13A, channel 1224A is not frequency shifted, as shown by spectra 1234A, but channel 1224D is frequency shifted up to the 25 GHz range, as shown by spectra 1234D. The embodiment shown in FIG. 12 uses a frequency mixer 1228D to frequency shift channel 1224D and also uses mixers 1228B and 1228C to frequency shift channels 1224B and 1224C, respectively. No frequency mixer is used for channel 1224A since it is not frequency shifted. Alternate embodiments may frequency shift some, none or all of the channels 1224 and devices other than frequency mixers may be used to achieve the frequency shifting. Tones 1237 are added after this frequency shifting. In the example of FIG. 13A, each tone 1237 is located at a slightly lower frequency than its corresponding channel 1224. In other embodiments, the tones may be located at other frequencies, including for example at frequencies higher than those of the corresponding channel. In other embodiments, the tones 1237 may also be added at different times during the signal processing and/or different channels may share a common tone. In addition, the electrical transmitters 1208 may include frequency shifters to move the spectral location of channels 1224, for example if they would otherwise overlap with the tones 1237. In this embodiment, the electrical high-speed channel 1226 has a total data rate of 40 Gbps and a spectral width of approximately 25 GHz, as shown in FIG. 13A. In the embodiment shown in FIG. 12, the FDM multiplexer 1209 also includes filters 1235, which filter out unwanted frequency components.

Transmitter 1210 is an E/O converter, which in this embodiment includes a laser 1212 and a Mach-Zender modulator 1214. The laser 1212 generates an optical carrier at a frequency $f_c$ and the MZM 1214 modulates the optical carrier with the 40 Gbps electrical high-speed channel 1226. As described previously, the MZM may be operated at a number of different bias points. In this embodiment, it is biased at a point at or close to the $V_\pi$ points 404 of FIG. 4. In some applications, it is preferable to bias the MZM at the $V_\pi$ point. For example, if separate pilot tones are used, reducing or eliminating the optical carrier will save power. In theory, biasing at the $V_\pi$ point should eliminate the optical carrier but practical constraints usually result in a reduced but non-zero optical carrier. The result is a composite optical signal 1242 with double sideband modulation and a reduced optical carrier, as shown in FIG. 13B. Note that the composite optical signal 1242 has two optical sidebands 1243U and 1243L, each including four separate subbands 1224A–1224D. As mentioned previously, although this example is based on a double sideband optical signal 1242, single sideband signals may also be used. For example, in one embodiment, the lower sideband 1243L of composite signal 1242 is eliminated, for example by optical filtering. The resulting composite signal would occupy half the spectral bandwidth.

On the receive side, the receiver subsystem 1204 includes an optical splitter 1232 which is optically coupled to four heterodyne receivers 1230A–1230D, each of which is coupled to an electrical receiver 1238. The splitter 1232 splits the received composite signal 1242 into four optical signals 1252A–1252D, one for each heterodyne receiver 1230. Accordingly, each optical signal includes a primary subband 1224 of interest plus corresponding tone 1237. In this embodiment, the optical splitter 1232 is a power splitter with wavelength filters, as described previously. In an alternate embodiment, the optical splitter 1232 includes separate splitters, each of which splits off one of the optical signals 1252 from the composite signal 1242.

FIG. 13C shows the spectrum for signal 1252A, as an example. The primary subband 1271A(U) and tone 1272A (U) for optical signal 1252A is located in the spectral region located 0–5.5 GHz above the optical carrier. The primary subband 1271A(U) and tone 1272A(U) in FIG. 13C correspond to subband 1224A(U) and tone 1237A(U) in FIG. 13B. The other subbands (subbands 1271A(L) and 1271B (U) are shown in FIG. 13C) are attenuated by the wavelength filters, which have spectral response shown by the dashed line 1273A. FIG. 13C also shows the frequency spectrum for optical signal 1252D with primary subband 1271D(U) and tone 1272D(U), which correspond to subband 1224D(U) and tone 1237D(U) in FIG. 13B. Again, the dashed line 1273D shows the spectral response of the corresponding wavelength filter.

In the embodiment shown, the heterodyne receivers 1230 recover the original electrical signals 1254 from the incoming optical signals 1252. Continuing the trace of signals through receiver 1230A, receiver 1230A uses an optical local oscillator which is located at a frequency which is 11.5 GHz removed from the optical carrier frequency.

Figure 13D:
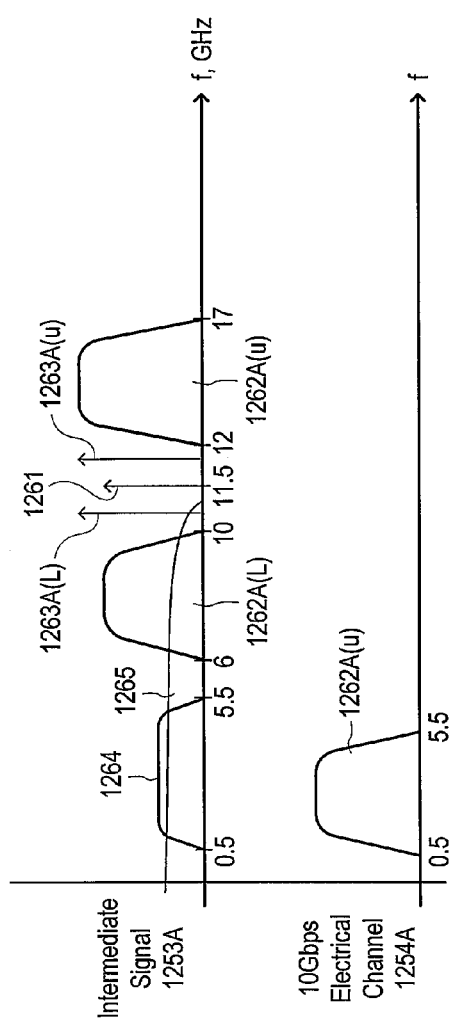

Spectrum 1253A of FIG. 13D shows the relevant portions of the signal after the optical local oscillator has been combined with the incoming optical signal 1252A and then detected by the square law detector. The spectrum 1253A includes several frequency components 1261–1265. Frequency components 1261, 1262A and 1263A are the frequency-offset versions of the optical carrier, subbands 1271A and tones 1272A, respectively.

Using a square law detector, frequency components 1264 and 1265 result from the direct detection of the received signal. For convenience, these components 1264 and 1265 shall be referred to as direct detection components. In particular, frequency component 1264 generally includes the direct detection cross-products of the subband of interest and tones which are located close in frequency, for example the cross-product of subband 1271A(U) with tone 1272A(U). Frequency component 1264 may also include the direct detection cross-products of other subbands and tones if they have not been significantly filtered, for example the cross-product of subband 1271B(U) with tone 1272B(U). Frequency component 1265 generally includes the direct detection square-products of the subband of interest, for example the square product of 1271A(U) in this example. It may also include direct detection cross-products of subbands with each other, for example the cross-product of subband 1271A (U) with 1271A(L).

Note that frequency components 1264 and 1265 typically represent the most significant unwanted frequency components, but not the only unwanted frequency components. For example, cross-products of tones and carriers and not shown in FIG. 13D. Neither are all of the possible cross-products which theoretically could be generated from the square law detection. Although not shown in FIG. 13D, all of these frequency components are accounted for in the overall design, typically either by ensuring that they fall outside the frequency band of interest or by sufficiently attenuating them (or the frequency components which give rise to them) so that they are negligible.

Spectrum 1253A illustrates an embodiment in which the local oscillator is selected so that the direct detection components 1264 and 1265 do not overlap with the primary subband 1262A(U). In the example given here, the frequency offset is 11.5 GHz, but any suitable offset may be chosen. In an alternate embodiment, the direct detection components 1264 and/or 1265 may overlap with the primary subband 1262A(U) so long as the resulting crosstalk is tolerable.

The subband 1262A(U) is frequency filtered and frequency down-shifted to approximately the 0–5.5 GHz spectral location by using component 1263A(U) as the tone in the signal extractor, yielding the electrical signal 1254A, as shown in FIG. 13D. The frequency filtering also reduces the noise which results from the local oscillator beating with optical noise in the signal.

Figure 13E:
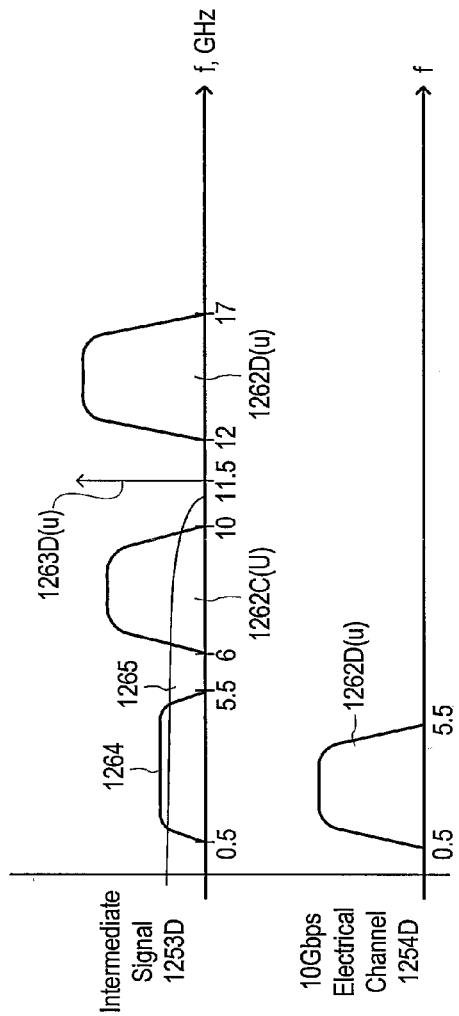

Optical signal 1252D is similarly processed, as shown in FIG. 13E. More specifically, the local oscillator for heterodyne receiver 1230D is selected to be 11.5 GHz offset from tone 1272D(U). Spectrum 1253D of FIG. 13E shows the signal after this optical local oscillator has been combined with the incoming optical signal 1252D and then detected by the square law detector. Frequency components 1263D(U), 1262D(U) and 1262C(U) are the frequency-offset versions of the tone 1272D(U), the primary subband 1271D(U) and other subband 1271C(U), respectively. Frequency components 1264 and 1265 are direct detection components. The subband 1262D(U) is frequency filtered and frequency down-shifted to the 0–5.5 GHz spectral location, yielding the electrical signal 1254D, as shown in FIG. 13E.

Note that since receiver subsystem 1204 splits the composite signal 1242 into four signals, each of which is processed by a different heterodyne receiver 1230, each heterodyne receiver can have a narrower spectral response than if the entire composite signal were processed by a single receiver. In this case, each heterodyne receiver 1230 recovers a signal of approximately 5 GHz spectral width and requires a similar spectral operating range; whereas the composite signal has a sideband width of approximately 25 GHz.

Electrical receiver 1238 reverses the functionality of electrical transmitter 1208, separating the incoming 5.5 GHz electrical signal 1254 into its 64 constituent 150 Mbps low-speed channels 1256. Accordingly, each receiver 1238 includes the same construction as element 240 in FIG. 6A of the FDM Application. An FDM demultiplexer (elements 624 and 622 in FIG. 6A) frequency demultiplexes the 5.5 GHz electrical signal 1254 into 64 separate electrical channels, each of which is then QAM demodulated by a QAM demodulator (included in element 620 in FIG. 6A).

System 1200, like the other systems described, is an example. The invention is not limited to the specific numbers of transmitters and/or receivers, frequency ranges, data rates, etc. Other variations will be apparent. For example, a 40 Gbps transmitter subsystem 1202 operating at a first wavelength $\lambda_1$ could be used as the transmitter 1100A in system 1100, a second transmitter subsystem 1202 operating at wavelength $\lambda_2$ as transmitter 1100B, and so on, with corresponding changes on the receive side. In this way, systems 1100 and 1200 can be combined to yield an even higher data rate system.

Figure 15A:
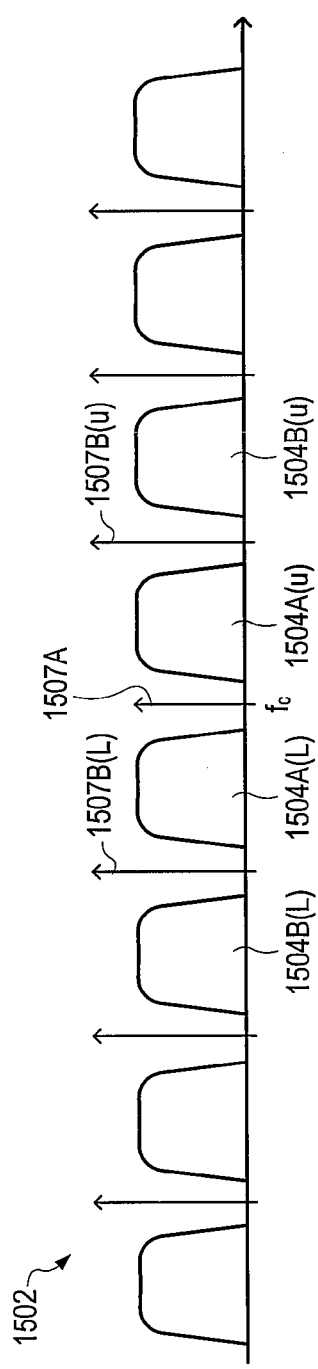
Figure 15B:
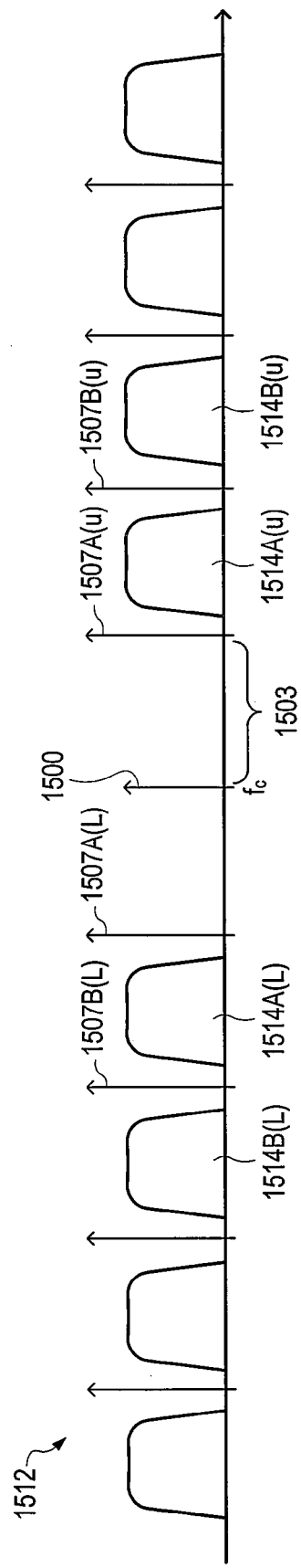

As another example, FIG. 13B illustrates one example composite signal 1242 in which each subband 1224 has a corresponding tone 1237 and the tones 1237 are located between the optical carrier and the corresponding subband 1224. FIGS. 15A–15D illustrate other types of composite optical signals. In FIG. 15A, the composite signal 1502 is similar to composite signal 1242 of FIG. 13B with one difference. The tone 1507A for the innermost subbands 1504A is located at the same frequency as the optical carrier rather than at a separate frequency, as is the case with tones 1237A in FIG. 13B. In FIG. 15B, the composite signal 1512 is similar to composite signal 1242 except that there is a wide spectral separation 1503 between the subbands 1514 and optical carrier 1500. In FIG. 15C, each subband 1534 is located between the optical carrier 1500 and the corresponding tone 1537, instead of vice versa as in FIG. 13B. As a final example, in FIG. 15D, the tones 1547 are shared by subbands 1544. For example, tone 1547A(U) corresponds to both subband 1544A(U) and subband 1544B(U). Other variations will be apparent.

Although the invention has been described in considerable detail with reference to certain preferred embodiments thereof, other embodiments are possible. Therefore, the scope of the appended claims should not be limited to the description of the preferred embodiments contained herein.

What is claimed is:

1. An optical communications system for communicating information comprising:
a receiver subsystem comprising:
an optical splitter for splitting a composite optical signal having at least two subbands of information and at least one tone into at least two optical signals; and
at least two heterodyne receivers, each heterodyne receiver coupled to receive one of the optical signals from the optical splitter for recovering information from one of the subbands contained in the optical signal, each heterodyne receiver comprising:
a heterodyne detector for mixing an optical local oscillator signal with the optical signal to produce an electrical signal which includes a frequency down-shifted version of the subband and the tone of the optical signal; and
a signal extractor coupled to the heterodyne detector for mixing at least one portion of the frequency down-shifted subband with the frequency down-shifted tone to produce a frequency component containing the information;
wherein a signal extractor of one of the at least two heterodyne receivers comprises two extraction paths and a combiner, each extraction path configured to process a different one of at least two sidebands within the electrical signal, wherein a first extraction path of the two extraction paths is configured to process only an upper sideband within the electrical signal, wherein said processing of the upper sideband comprises mixing the frequency down-shifted tone with the upper sideband, and a second extraction path of the two extraction paths is configured to process only a lower sideband within the electrical signal, wherein said processing of the lower sideband comprises mixing the frequency down-shifted tone with the lower sideband.

2. The optical communications system of claim 1 wherein the optical splitter includes a separate splitter for separating each optical signal from the composite signal.

3. The optical communication system of claim 1 wherein the optical splitter includes an optical power splitter for splitting the composite optical signal into optical signals which are substantially the same in spectral shape.

4. The optical communications system of claim 1 wherein the optical splitter includes a wavelength division demultiplexer for wavelength division demultiplexing the composite optical signal into the optical signals.

5. The optical communications system of claim 1 wherein the optical splitter includes a wavelength-selective optical power splitter for splitting the composite optical signal into optical signals, each optical signal including a different primary subband and attenuated other subbands.

6. The optical communications system of claim 1 wherein:
the electrical signal further comprises direct detection components; and
the frequency down-shifted version of the subband does not spectrally overlap with the direct detection components.

7. The optical communications system of claim 1 wherein the heterodyne detector comprises:
an optical combiner for combining the optical local oscillator signal and the optical signal; and
a square law detector disposed to receive the combined optical local oscillator signal and optical signal.

8. The optical communications system of claim 1 further comprising:
an optical wavelength filter coupled between the optical splitter and one of the heterodyne receivers.

9. The optical communications system of claim 1 wherein the tone for each optical signal is located at an optical carrier frequency for the corresponding subband.

10. The optical communications system of claim 1 wherein the tone for an optical signal includes a pilot tone located at a frequency other than at an optical carrier frequency for the corresponding subband.

11. The optical communications system of claim 1 wherein the upper sideband and the lower sideband are sidebands of a common pilot tone.

12. The optical communications system of claim 1 wherein the frequency component includes a difference component.

13. The optical communications system of claim 1 wherein the receiver subsystem further comprises:
at least two FDM demultiplexers, each FDM demultiplexer coupled to receive the frequency component from one of the heterodyne receivers for FDM demultiplexing the frequency component into a plurality of electrical low-speed channels.

14. The optical communications system of claim 13 wherein the receiver subsystem further comprises:
at least two QAM demodulation stages, each QAM demodulation stage coupled to one of the FDM demultiplexers for QAM demodulating the electrical low-speed channels.

15. The optical communications system of claim 1 further comprising:
a transmitter subsystem for generating the composite optical signal.

16. The optical communications system of claim 15 wherein the transmitter subsystem comprises:
at least two transmitters, each for generating one of the subbands, each transmitter using a different optical carrier frequency; and
an optical combiner coupled to the transmitters for optically combining the subbands into the composite optical signal.

17. The optical communications system of claim 15 wherein the transmitter subsystem comprises:
at least two electrical transmitters for generating electrical channels;
an FDM multiplexer coupled to the electrical transmitters for FDM multiplexing the electrical channels into an electrical high-speed channel, the electrical highspeed channel further including the tones; and
an E/O converter coupled to the FDM multiplexer for converting the electrical high-speed channel into the composite optical signal.

18. A method for recovering information from a composite optical signal containing the information, the method comprising:
receiving a composite optical signal having at least two subbands of information and at least one tone;
splitting the composite optical signal into at least two optical signals; and
for each optical signal:
receiving a signal from an optical local oscillator;
detecting the optical signal using heterodyne detection and the optical local oscillator to produce an electrical signal which includes a frequency down-shifted version of one of the subbands and the tone of the optical signal; and mixing at least one portion of the frequency down-shifted subband with the frequency down-shifted tone to produce a freqency component containing the information, wherein for at least one of the optical signals, the step of mixing comprises mixing by a signal extractor comprising two extraction paths and a combiner, each extraction path configured to process a different one of at least two sidebands within the electrical signal, wherein a first extraction path of the two extraction paths is configured to process only an upper sideband within the electrical signal, wherein said processing of the upper sideband comprises mixing the frequency down-shifted tone with the upper sideband, and a second extraction path of the two extraction paths is configured to process only a lower sideband within the electrical signal, wherein said processing of the lower sideband comprises mixing the frequency down-shifted tone with the lower sideband.

19. The method of claim 18 wherein the upper sideband and the lower sideband are sidebands of a common pilot tone.

20. The method of claim 18 wherein the step of splitting the composite optical signal into at least two optical signals includes splitting the composite optical signal into optical signals which are substantially the same in spectral shape.

21. The method of claim 18 wherein the step of splitting the composite optical signal into at least two optical signals includes wavelength division demultipexing the composite optical signal into the optical signals.

22. The method of claim 18 wherein the step of splitting the composite optical signal into at least two optical signals includes wavelength selectively splitting the composite optical signal into optical signals, each optical signal including a different primary subband and attenuated other subbands.

23. The method of claim 18 wherein the step of detecting the optical signal using heterodyne detection and the optical local oscillator comprises:
optically combining the optical local oscillator signal and the optical signal; and
detecting the combined optical local oscillator signal and optical signal using square law detection.

24. The method of claim 18 wherein the tone for each optical signal is located at an optical carrier frequency for the corresponding subband.

25. The method of claim 18 wherein the tone for an optical signal includes a pilot tone located at a frequency other than an optical carrier frequency for the corresponding subband.

26. The method of claim 18 further comprising, for each optical signal:
FDM demultiplexing the frequency component into a plurality of electrical low-speed channels.

27. The method of claim 26 further comprising, for each optical signal: QAM demodulating the electrical low-speed channels.

28. The method of claim 18 further comprising:
encoding the information in a composite optical signal; and
transmitting the composite optical signal across an optical fiber.

29. The method of claim 28 wherein the step of encoding the information in a composite optical signal comprises:
encoding the information onto subbands, each subband located at a different optical carrier frequency; and
optically combining the subbands to produce the composite optical signal.

30. The method of claim 28 wherein the step of encoding the information in a composite optical signal comprises:
generating electrical channels;
FDM multiplexing the electrical channels into an electrical high-speed channel, the electrical high-speed channel further including the tones; and
converting the electrical high-speed channel from electrical to optical form to produce the composite optical signal.

31. The method of claim 28 wherein the step of encoding the information in a composite optical signal comprises:
receiving an optical carrier; and
modulating the optical carrier with the information using a raised cosine modulation biased at a point substantially around a $V_\pi$ point.

* * * * *